(12) United States Patent
Ross et al.

(10) Patent No.: US 12,072,714 B2
(45) Date of Patent: Aug. 27, 2024

(54) SYSTEMS AND METHODS FOR DETECTION OF FEATURES WITHIN DATA COLLECTED BY A PLURALITY OF ROBOTS BY A CENTRALIZED SERVER

(71) Applicant: Brain Corporation, San Diego, CA (US)

(72) Inventors: David Ross, San Diego, CA (US); Botond Szatmary, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 17/145,908

(22) Filed: Jan. 11, 2021

(65) Prior Publication Data
US 2021/0213616 A1    Jul. 15, 2021

Related U.S. Application Data

(60) Provisional application No. 62/958,962, filed on Jan. 9, 2020.

(51) Int. Cl.

| | |
|---|---|
| G05D 1/00 | (2024.01) |
| B25J 9/16 | (2006.01) |
| B25J 13/08 | (2006.01) |
| G06V 10/22 | (2022.01) |
| G06V 10/44 | (2022.01) |
| G06V 10/764 | (2022.01) |
| G06V 10/82 | (2022.01) |

(Continued)

(52) U.S. Cl.
CPC ............ *G05D 1/0274* (2013.01); *B25J 9/161* (2013.01); *B25J 9/1653* (2013.01); *B25J 9/1697* (2013.01); *B25J 13/089* (2013.01); *G06V 10/235* (2022.01); *G06V 10/454* (2022.01); *G06V 10/764* (2022.01); *G06V 10/82* (2022.01); *G06V 10/95* (2022.01); *G06V 20/10* (2022.01); *G06V 20/52* (2022.01); *G06V 20/68* (2022.01)

(58) Field of Classification Search
CPC ........ B25J 9/1697; B25J 9/161; B25J 9/1653; B25J 13/089
See application file for complete search history.

(56) References Cited

U.S. PATENT DOCUMENTS

| | | | | |
|---|---|---|---|---|
| 2012/0215380 | A1* | 8/2012 | Fouillade | G05D 1/0044 701/2 |
| 2018/0035606 | A1* | 2/2018 | Burdoucci | H04N 5/232935 |

(Continued)

*Primary Examiner* — Jaime Figueroa
*Assistant Examiner* — Arslan Azhar
(74) *Attorney, Agent, or Firm* — Reed Smith LLP; Sidharth Kapoor

(57) ABSTRACT

Systems and methods for detection of features within data collected by a plurality of robots by a centralized server are disclosed herein. According to at least one non-limiting exemplary embodiment, a plurality of robots may be utilized to collect a substantial amount of feature data using one or more sensors coupled thereto, wherein use of the plurality of robots to collect the feature data yields accurate localization of the feature data and consistent acquisition of the feature data. Systems and methods disclosed herein further enable a cloud server to identify a substantial number of features within the acquired feature data for purposes of generating insights. The substantial number of features far exceed a practical number of features of which a single neural network may be trained to identify.

21 Claims, 21 Drawing Sheets

(51) Int. Cl.
*G06V 10/94* (2022.01)
*G06V 20/10* (2022.01)
*G06V 20/52* (2022.01)
*G06V 20/68* (2022.01)

(56) References Cited

U.S. PATENT DOCUMENTS

2019/0043203 A1* 2/2019 Fleishman ............. H04N 5/247
2020/0050206 A1* 2/2020 Deyle ................ G01C 21/3461
2020/0401853 A1* 12/2020 Xiong .................... G06V 40/10
2021/0096579 A1* 4/2021 Artes ................... G05D 1/0274
2021/0247775 A1* 8/2021 Cen ..................... G05D 1/0248

* cited by examiner

| Location | Feature 1 | Feature 2 | Feature 3 | Feature 4 | ... | Feature N |
|---|---|---|---|---|---|---|
| Supermarket | ✓ | | ✓ | | | ✓ |
| Land Survey | ✓ | ✓ | ✓ | | | ✓ |
| Theme Park | | | ✓ | ✓ | | |
| ... | | | | | | |

FIG. 6

SYSTEMS AND METHODS FOR DETECTION OF FEATURES WITHIN DATA COLLECTED BY A PLURALITY OF ROBOTS BY A CENTRALIZED SERVER

PRIORITY

This application claims the benefit of U.S. Provisional Patent Application Ser. No. 62/958,962 filed on Jan. 9, 2020 under 35 U.S.C. § 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

SUMMARY

The present application generally relates to robotics, and more specifically to systems and methods for detection of features within data collected by a plurality of robots by a centralized server.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a server system is disclosed. The server system, comprises: at least one robot coupled thereto, and at least one processor configured to execute computer readable instructions to: receive at least one image from a sensor on the at least one robot, the at least one image includes a corresponding location, the corresponding location comprising a location of the at least one robot during acquisition of the image: construct a map based on the locations of the images, the map includes a plurality of user selectable locations each corresponding to at least one image captured by the robot at the respective location: and provide a device with at least a portion of the constructed map when requested by the device.

According to at least one non-limiting exemplary embodiment, upon the user selecting a location of the plurality, the at least one processor displays the at least one image captured by the robot at the selected location.

According to at least one non-limiting exemplary embodiment, the at least one processor communicates at least one additional image corresponding to a neighboring location to the selected location causing the device to store the at least one additional image in a buffer.

According to at least one non-limiting exemplary embodiment, the at least one image captured at each of the locations comprises at least one of a plurality of images stitched or aligned together, a panoramic image, or a 360° view image captured by a wide field of view camera.

According to at least one non-limiting exemplary embodiment, the at least one processor is further configured to: identify one or more features within the image displayed at the selected location using one or more neural networks coupled to the server.

According to at least one non-limiting exemplary embodiment, the at least one processor is further configured to: transmit identification of one or more features within the image to cause the device to display the identification of one or more features, the one or more features corresponding to selected ones of a plurality of features depicted at the location.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 6 is an exemplary implementation of a selector as a look-up table, according to an exemplary embodiment.

Figure 1A:
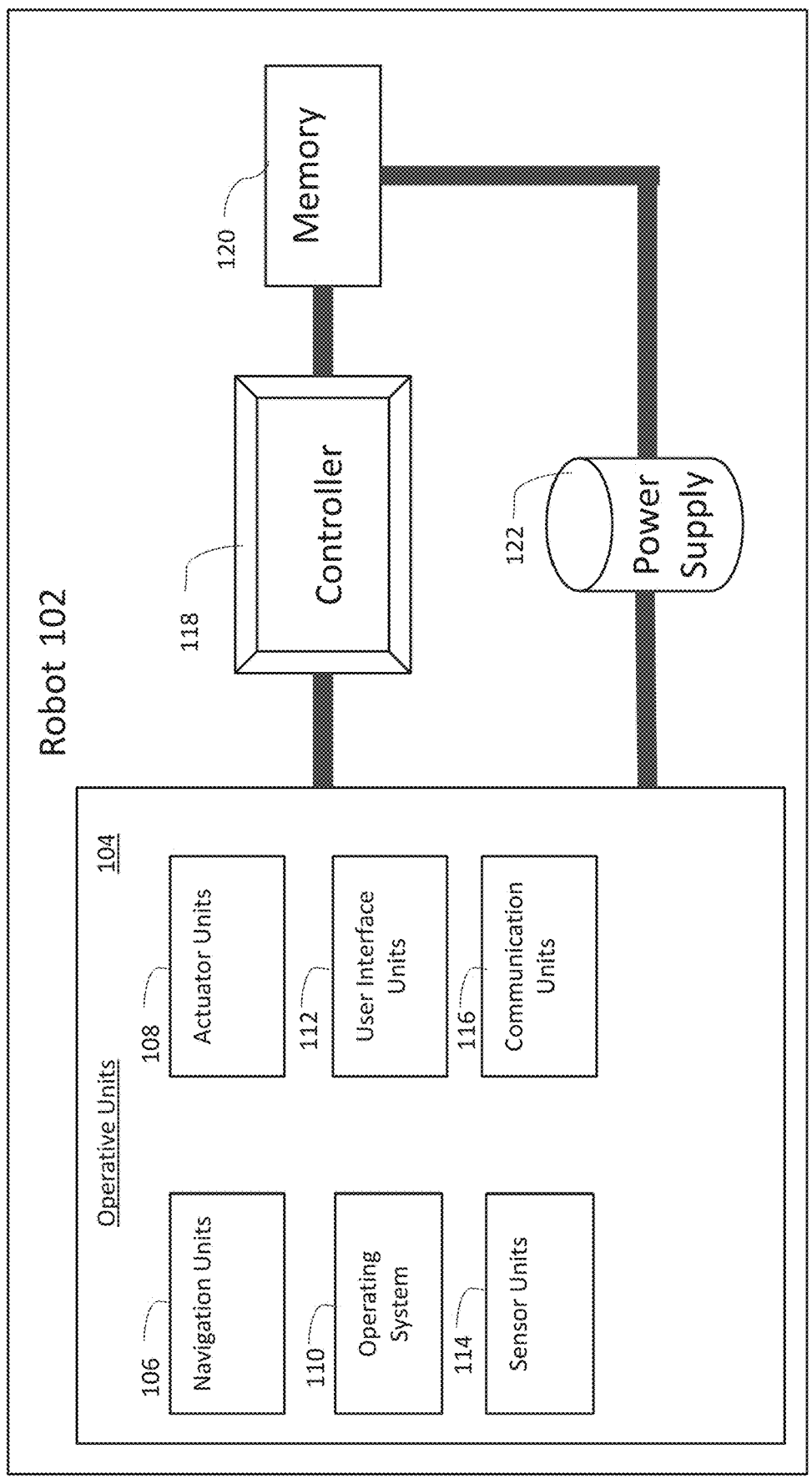
FIG. 1A is a functional block diagram of a robot in accordance with some embodiments of this disclosure.

All Figures disclosed herein are © Copyright 2021 Brain Corporation. All rights reserved.

DETAILED DESCRIPTION

Currently, neural networks may be trained to perform a specific task. A typical use case comprises neural networks being trained to identify features within color images, point clouds, or any other data structure representative of the features. These neural networks may be trained to perform a specified task (e.g., identify brands of soda cans within an image of soda cans) using a large set of training data. The training data may be costly, from a time and labor perspective, to produce such that training a single neural network to identify a substantial number of features may be impractical.

Robots may comprise one or more sensors configured to measure and detect features. These features may be identified using specially trained neural networks, provided the specially trained neural networks are trained to identify the features. Robots may operate within complex environments, such as retail stores, comprising a substantial number (e.g., tens of thousands) of features therein. Training neural networks to identify all features within every environment in which robots may operate may be valuable yet costly. Accordingly, there is a need in the art for systems and methods for identification of features using a system of neural networks and a robotic network.

The foregoing needs and drawbacks in the conventional technology are overcome by the present disclosure, which provides for, inter alia, systems and methods for detection of features within data collected by a plurality of robots by a centralized server, wherein use of a network of robots, by the systems and methods, to collect data of the features further enhances reliability, consistency, and localization of features identified by the system of neural networks, as disclosed herein.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for detection of features within data collected by a plurality of robots by a server. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a feature may comprise one or more numeric values (e.g., floating point, decimal, a tensor of values, etc.) characterizing an input from a sensor unit including, but not limited to, detection of an object (e.g., humans, couches, cars, cats, etc. represented in point clouds, RGB images, etc.), parameters of the object (e.g., size, shape, color, orientation, edges, etc.), color values of pixels of an image, depth values of pixels of a depth image, brightness of an image, the image as a whole, changes of features over time (e.g., velocity, trajectory, etc. of an object), sounds, spectral energy of a spectrum bandwidth, motor feedback (i.e., encoder values), sensor values (e.g., gyroscope, accelerometer, GPS, magnetometer, etc. readings), a binary categorical variable, an enumerated type, a character/string, or any other characteristic of a sensory input.

As used herein, data may comprise, including but not limited to, a set of values representative of one or more features, parameters, and/or things. Data may be stored in any digital format such as matrices, arrays, strings, tensors, floating point values, and/or integer values in a computer-readable format. Data may also comprise analog signals, such as waveforms, voltages, currents, stored charges, electromagnetic signals, and/or other measurable parameters. For avoidance of doubt, data is a generic term in the realm of computer networks and computer technology that represents ordered series of characters and/or numbers that are used to convey information. Data may be communicated via wired and/or wireless transmission.

As used herein, a planogram (also referred to as plan-o-gram) may comprise a predetermined layout of items on a shelf or display within a store or a commercial facility. Planograms may be configured based on research conducted by companies selling the items of the planograms to maximize turnover rate of the items. Planograms typically comprise a type of items displayed thereon (e.g., a soda planogram, a pet food planogram, a makeup planogram, etc.) that details how the respective products should be displayed. Shelves and displays may be mapped within stores utilizing planograms such that each mapped shelf or display may comprise an associated planogram thereto such that a product type (e.g., soda, pet food, makeup, etc.) may be localized within the stores based on the map of the planograms and associated shelves/displays.

As used herein, a shelf keeping unit ("SKU") comprises a unique numeric or alphanumeric identifier corresponding to a specific item. For example, a candy bar of a first type may have a different SKU than other candy bars, but each candy bar of the first type may include the same SKU. SKUs may be specific to an environment, store, and/or brand of store. Although various systems and methods are discussed below using SKUs, one skilled in the art may appreciate that SKUs may be replaced with other forms of product identification, such as universal product codes ("UPC").

As used herein, network interfaces may include any signal, data, or software interface with a component, network, or process including, without limitation, those of the Fire Wire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic devices ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include, without limitation, any sequence or human or machine-cognizable steps which perform a function. Such computer program and/or software may be rendered in any programming language or environment including, for example, C/C++, C #, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME-equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) improve workplace efficiency of associates working alongside robots: (ii) improve functionality of robots by enhancing feature identification capabilities: (iii) enhance a rate at which large amounts of feature data from a plurality of robots may be processed and analyzed: and (iv) generate useful insights based on data collected by robots, the insights being useful to either robots themselves or humans. Other advantages are readily discernible by one having ordinary skill in the art given the contents of the present disclosure.

FIG. 1A is a functional block diagram of a robot 102 in accordance with some exemplary embodiments of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic devices ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"). Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 include at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route: navigate around obstacles: rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics and features within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art). According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clocks/timers, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long-term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprised of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, or robot performing a task illustrated in the figures below comprises a controller executing computer-readable instructions stored on a non-transitory computer-readable storage apparatus, such as memory 120, as would be appreciated by one skilled in the art.

Figure 1B:
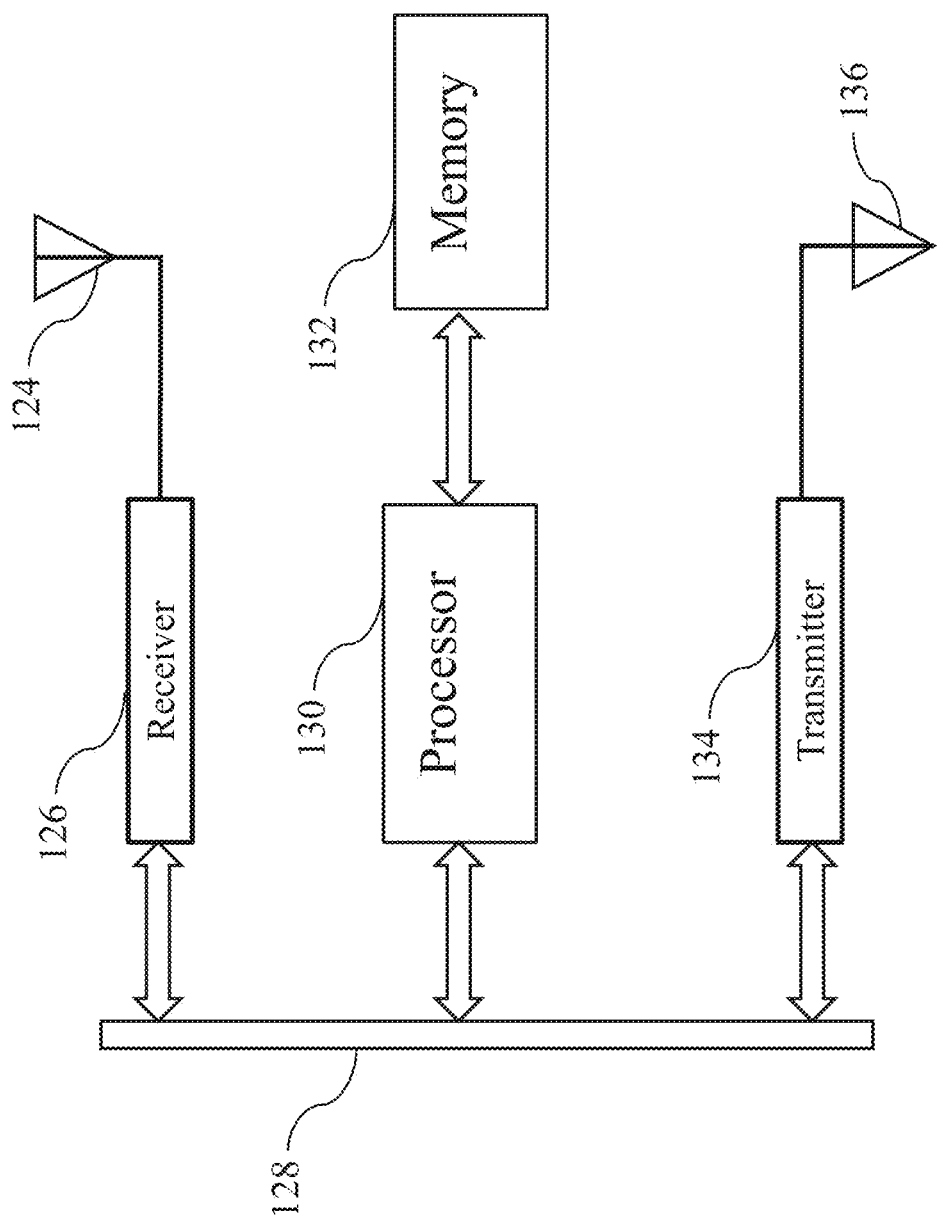
FIG. 1B is a functional block diagram of an architecture of the specialized controller or processor illustrated in FIG. 1A in accordance with some embodiments of this disclosure.

Next referring to FIG. 1B, the architecture of the specialized controller 118 used in the system shown in FIG. 1A is illustrated according to an exemplary embodiment. As illustrated in FIG. 1B, the specialized computer includes a data bus 128, a receiver 126, a transmitter 134, at least one processor 130, and a memory 132. The receiver 126, the processor 130 and the transmitter 134 all communicate with each other via the data bus 128. The processor 130 is a specialized processor configured to execute specialized algorithms. The processor 130 is configured to access the memory 132 which stores computer code or instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configured to receive input signals 124. The input signals 124 may comprise signals from a plurality of operative units 104 illustrated in FIG. 1A including, but not limited to, sensor data from sensor units 114, user inputs, motor feedback, external communication signals (e.g., from a server 202 described next in FIG. 2), and/or any other signal from an operative unit 104 requiring further processing by the specialized controller 118. The receiver 126 communicates these received signals to the processor 130 via the data bus 128. As one skilled in the art would appreciate, the data bus 128 is the means of communication between the different components-receiver, processor, and transmitter-in the specialized controller 118. The processor 130 executes algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD. DVD. HD-DVD. Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, non-volatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configured to further communicate the output signals to a plurality of operative units 104 illustrated by signal output 136.

One of ordinary skill in the art would appreciate that the architecture illustrated in FIG. 1B may illustrate an external server architecture configured to effectuate the control of a robotic apparatus from a remote location, such as server 202 described next in FIG. 2. That is, the server may also include at least one data bus, a receiver, a transmitter, a processor, and a memory that stores specialized computer-readable instructions thereon.

One of ordinary skill in the art would appreciate that a controller 118 of a robot 102 may include one or more processors 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processors 138 thereof executing computer readable instructions and, in some instances, the use of any hardware peripherals known within the art. Controller 118 may be illustrative of various processors 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processors 138 for performing high level tasks (e.g., planning a route to avoid obstacles) and processors 138 for performing low-level tasks (e.g., producing actuator signals in accordance with the route).

Figure 2:
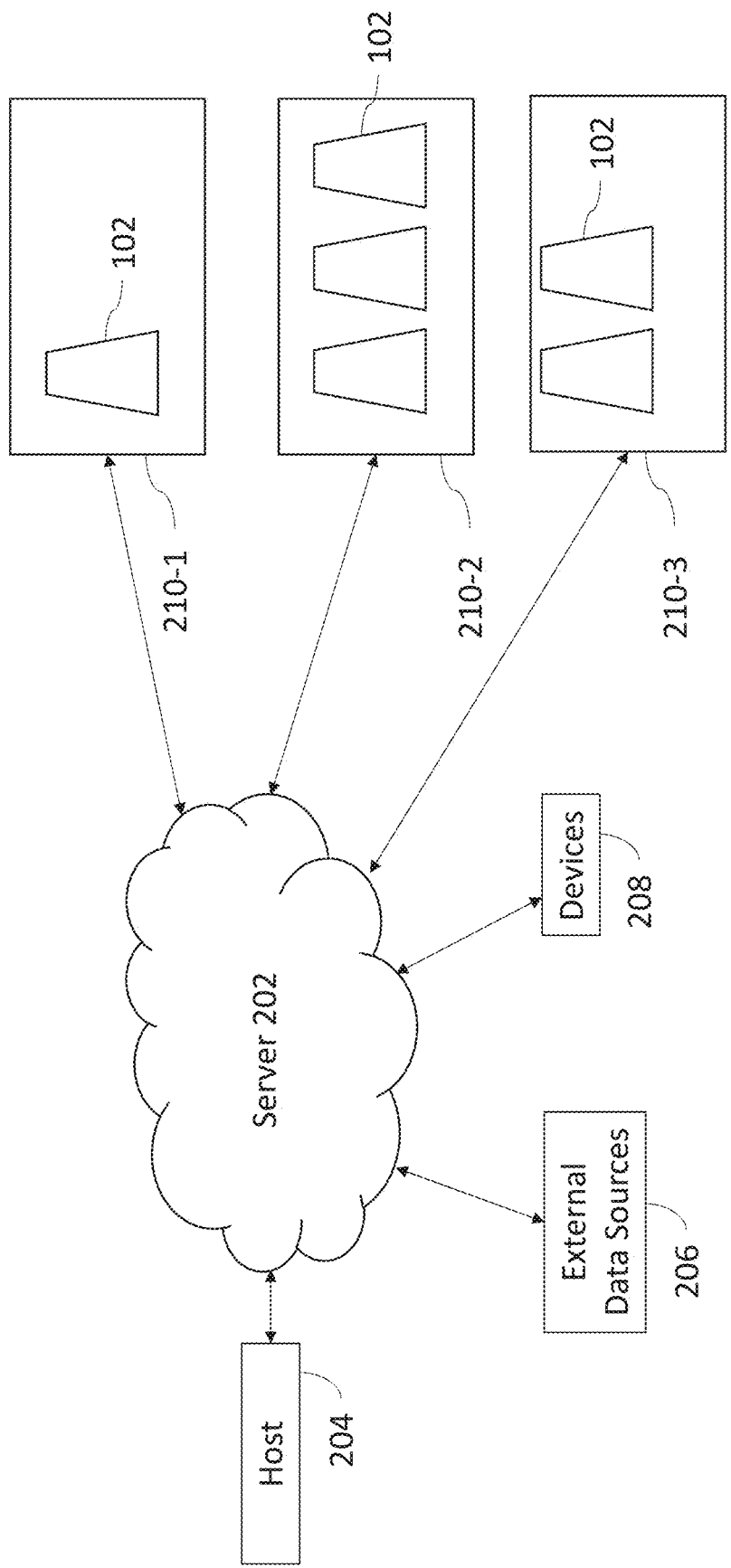
FIG. 2 is a functional block diagram of a cloud server and devices coupled thereto in accordance with some embodiments of this disclosure.

FIG. 2 illustrates a server 202 and communicatively coupled components 204, 206, 208, 210 thereof in accordance with some exemplary embodiments of this disclosure. The server 202 may comprise one or more processors 138 depicted in FIG. 1B above, each processor 138 may comprise at least one processor 130 and memory 132 therein in addition to, without limitation, any other components illustrated in FIG. 1B. The processing units may be centralized at a location or distributed among a plurality of devices (e.g., a dedicated server or a cloud server). Communication links between the server 202 and coupled devices may comprise wireless and/or wired communications, wherein the server 202 may further utilize one or more coupled antenna, relays, routers, etc. to effectuate the wireless communication. The server 202 may be coupled to a host 204, wherein the host 204 may correspond to a high-level entity (e.g., an administrator) of the server 202. The host 204 may, for example, upload software and/or firmware updates for the server 202 and/or coupled devices 208 and 210, connect or disconnect devices 208 and 210 to the server 202, or otherwise control operations of the server 202. External data sources 206 may comprise any publicly available data sources (e.g., public databases such as weather data from the National Oceanic and Atmospheric Administration ("NOAA"), satellite topology data, public records, etc.) and/or any other databases (e.g., private databases with paid or restricted access) of which the server 202 may access data therein. Devices 208 may comprise any device configured to perform a task at an edge of the server 202. These devices may include, without limitation, internet of things ("IoT") devices (e.g., stationary CCTV cameras, smart locks, smart thermostats, etc.), external processors (e.g., external CPUs or GPUs), and/or external memories configured to receive a sequence of computer readable instructions provided at least in part by the server 202 and/or store large amounts of data.

Lastly, the server 202 may be coupled to a plurality of robot networks 210, each robot network 210 comprising at least one robot 102. In some embodiments, each network 210 may comprise one or more robots 102 operating within separate environments from other robots 102 of other robot networks 210. An environment may comprise, for example, a section of a building (e.g., a floor or room), an entire building, a street block, or any enclosed and defined space in which the robots 102 operate. In some embodiments, each robot network 210 may comprise a different number of robots 102 and/or may comprise different types of robot 102. For example, network 210-1 may only comprise a robotic wheelchair, and network 210-1 may operate in a home of an owner of the robotic wheelchair or a hospital, whereas network 210-2 may comprise a scrubber robot 102, vacuum robot 102, and a gripper arm robot 102, wherein network 210-2 may operate within a retail store. Alternatively or additionally, in some embodiments, the robot networks 210 may be organized around a common function or type of robot 102. For example, a network 210-3 may comprise a plurality of security or surveillance robots that may or may not operate in a single environment, but are in communication with a central security network linked to server 202. Alternatively or additionally, in some embodiments, a single robot 102 may be a part of two or more networks 210. That is, robot networks 210 are illustrative of any grouping or categorization of a plurality of robots 102 coupled to the server.

Each robot network 210 may communicate data including, but not limited to, sensor data (e.g., RGB images captured, LiDAR scan points, network signal strength data from sensors 202, etc.), IMU data, navigation and route data (e.g., which routes were navigated), localization data of objects within each respective environment, and metadata associated with the sensor, IMU, navigation, and localization data. Each robot 102 within each network 210 may receive communication from the server 202 including, but not limited to, a command to navigate to a specified area, a command to perform a specified task, a request to collect a specified set of data, a sequence of computer readable instructions to be executed on respective controllers 118 of the robots 102, software updates, and/or firmware updates. One skilled in the art may appreciate that a server 202 may be further coupled to additional relays and/or routers to effectuate communication between the host 204, external data sources 206, devices 208, and robot networks 210 which have been omitted for clarity. It is further appreciated that a server 202 may not exist as a single hardware entity, rather may be illustrative of a distributed network of non-transitory memories and processors. In some embodiments, a robot network 210, such as network 210-1, may communicate data, e.g. share route and map information, with other networks 210-2 and/or 210-3. In some embodiments, a robot 102 in one network may communicate sensor, route or map information with a robot in a different network. Communication among networks 210 and/or individual robots 102 may be facilitated via server 202, but direct device-to-device communication at any level may also be envisioned. For example, a device 208 may be directly coupled to a robot 102 to enable the device 208 to provide instructions for the robot 102 (e.g., command the robot 102 to navigate a route).

One skilled in the art may appreciate that any determination or calculation described herein may comprise one or more processors/controllers of the server 202, devices 208, and/or robots 102 of networks 210 performing the determination or calculation by executing computer readable instructions. The instructions may be executed by a processor of the server 202 and/or may be communicated to robot networks 210 and/or devices 208 for execution on their respective controllers/processors in part or in entirety. Advantageously, use of a server 202 may enhance a speed at which parameters may be measured, analyzed, and/or calculated by executing the calculations (i.e., computer readable instructions) on a distributed network of processors on robots 102 and devices 208. Use of a distributed network of controllers 118 of robots 102 may further enhance functionality of the robots 102 as the robots 102 may execute instructions on their respective controllers 118 during times when the robots 102 are not in use by operators of the robots 102.

Figure 3:
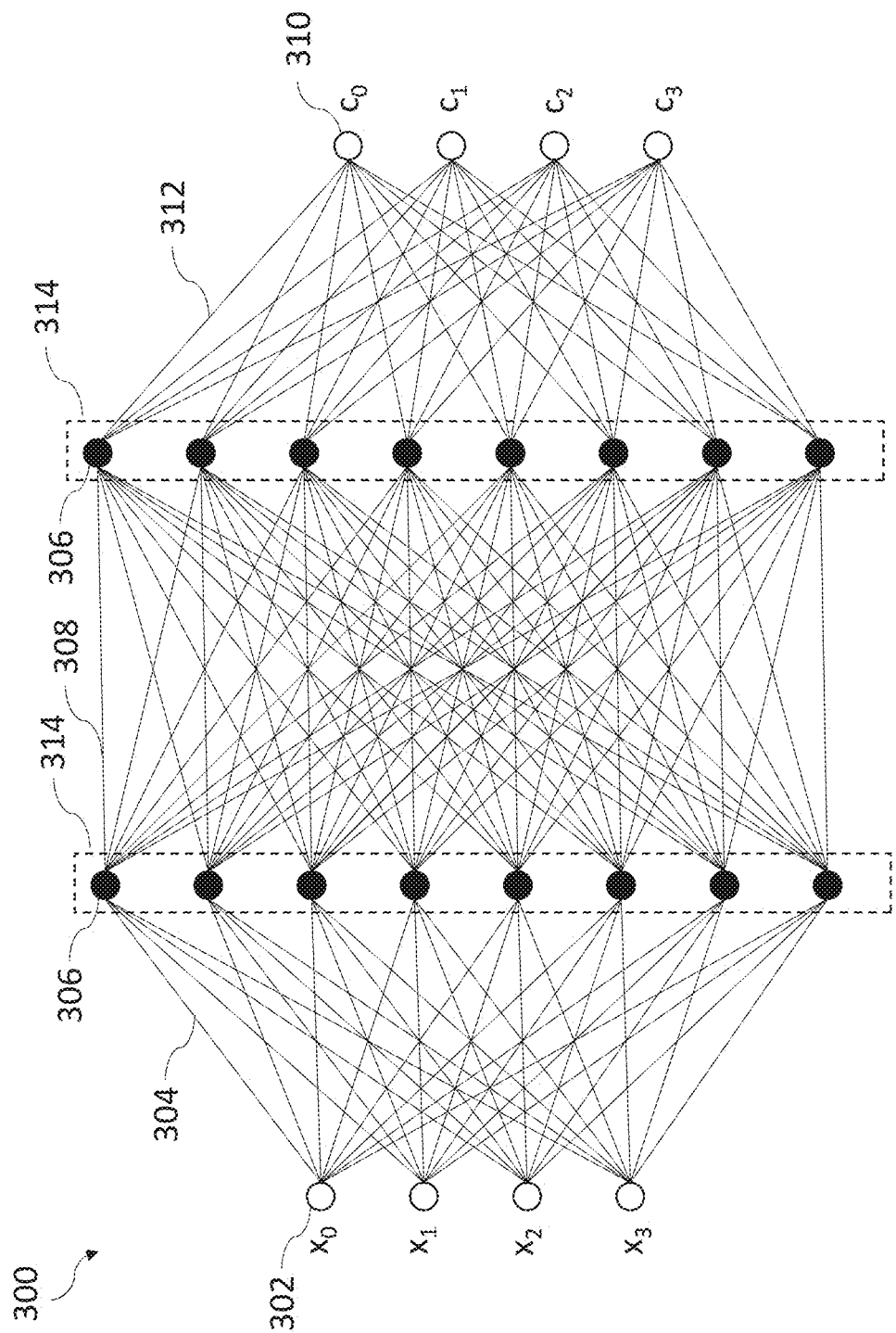
FIG. 3 illustrates an embodiment of a neural network in accordance with some embodiments of this disclosure.

FIG. 3 illustrates a neural network 300, according to an exemplary embodiment. The neural network 300 may comprise a plurality of input nodes 302, intermediate nodes 306, and output nodes 310. The input nodes 302 are connected via links 304 to one or more intermediate nodes 306. Some intermediate nodes 306 may be respectively connected via links 308 to one or more adjacent intermediate nodes 306. Some intermediate nodes 306 may be connected via links 312 to output nodes 310. Links 304, 308, 312 illustrate inputs/outputs to/from the nodes 302, 306, and 310 in accordance with Equation 1 below. The intermediate nodes 306 may form an intermediate layer 314 of the neural network 300. In some embodiments, a neural network 300 may comprise a plurality of intermediate layers 314, intermediate nodes 306 of each intermediate layer 314 being linked to one or more intermediate nodes 306 of adjacent layers, unless an adjacent layer is an input layer (i.e., input nodes 302) or an output layer (i.e., output nodes 310). The two intermediate layers 314 illustrated may correspond to a hidden layer or fully connected layer(s) of neural network 300. However, hidden layers may comprise more or fewer intermediate layers 314 or intermediate nodes 306. Each node 302, 306, and 310 may be linked to any number of nodes, wherein linking all nodes together as illustrated is not intended to be limiting. For example, the input nodes 302 may be directly linked to one or more output nodes 310.

The input nodes 306 may receive a numeric value $x_i$ of a sensory input of a feature, i being an integer index. For example, $x_i$ may represent color values of an $i^{th}$ pixel of a color image. The input nodes 306 may output the numeric value $x_i$ to one or more intermediate nodes 306 via links 304. Each intermediate node 306 may be configured to receive a numeric value on its respective input link 304 and output another numeric value $k_{i,j}$ to links 308 following the Equation 1 below:

$$k_{i,j} = a_{i,j}x_0 + b_{i,j}x_1 + c_{i,j}x_2 + d_{i,j}x_3 \quad \text{(Eqn. 1)}$$

Index i corresponds to a node number within a layer (e.g., $x_1$ denotes the first input node 302 of the input layer, indexing from zero). Index j corresponds to a layer, wherein j would be equal to one for the one intermediate layer 314-1 of the neural network 300 illustrated, but j may be any number corresponding to a neural network 300 comprising any number of intermediate layers 314. Constants a, b, c, and d represent weights to be learned in accordance with a training process. The number of constants of Equation 1 may depend on the number of input links 304 to a respective intermediate node 306. In this embodiment, all intermediate nodes 306 are linked to all input nodes 302, but this is not intended to be limiting. Intermediate nodes 306 of the second (rightmost) intermediate layer 314-2 may output values $k_{i,2}$ to respective links 312 following Equation 1 above. It is appreciated that constants a, b, c, d may be of different values for each intermediate node 306. Further, although the above Equation 1 utilizes addition of inputs multiplied by respective learned coefficients, other operations are applicable, such as convolution operations, thresholds for input values for producing an output, and/or biases, wherein the above equation is intended to be illustrative and non-limiting. In some embodiments, Equation 1 may further comprise a bias term or value learned during training which does not depend on inputs.

Output nodes 310 may be configured to receive at least one numeric value $k_{i,j}$ from at least an $i^{th}$ intermediate node 306 of an intermediate layer 314. As illustrated, for example, each output node 310 receives numeric values $k_{0-7,2}$ from the eight intermediate nodes 306 of the second intermediate layer 314-2. The output of the output nodes 310 may comprise a classification of a feature of the input nodes 302. The output $c_i$ of the output nodes 310 may be calculated following a substantially similar equation as Equation 1 above (i.e., based on learned weights and inputs from connections 312). Following the above example where inputs $x_i$ comprise pixel color values of an RGB image, the output nodes 310 may output a classification $c_i$ of each input pixel (e.g., pixel i is a car, train, dog, person, background, soap, or any other classification). Other outputs of the output nodes 310 are considered, such as, for example, output nodes 310 predicting a temperature within an environment at a future time based on temperature measurements provided to input nodes 302 at prior times and/or at different locations.

The training process comprises providing the neural network 300 with both input and output pairs of values to the input nodes 302 and output nodes 310, respectively, such that weights of the intermediate nodes 306 may be determined. An input and output pair used for training include ground truth data comprising values for the input nodes 302 and corresponding correct values for the output nodes 310 (e.g., an image and corresponding annotations or labels). The determined weights configure the neural network 300 to receive input to input nodes 302 and determine a correct output at the output nodes 310. By way of illustrative example, annotated (i.e., labeled) images may be utilized to train a neural network 300 to identify objects or features within the image based on the annotations and the image itself, and the annotations may comprise, e.g., pixels encoded with "cat" or "not cat" information if the training is intended to configure the neural network 300 to identify cats within an image. The unannotated images of the training pairs (i.e., pixel RGB color values) may be provided to input nodes 302 and the annotations of the image (i.e., classifications for each pixel) may be provided to the output nodes 310, wherein weights of the intermediate nodes 306 may be adjusted such that the neural network 300 predicts the annotations of the image based on the provided pixel color values to the input nodes 302. This process may be repeated using a substantial number of labeled images (e.g., hundreds or more) such that ideal weights of each intermediate node 306 may be determined. The training process is complete when predictions made by the neural network 300 falls below a threshold error rate, which may be defined using a cost function.

As used herein, a training pair may comprise any set of information provided to input and output of the neural network 300 for use in training the neural network 300. For example, a training pair may comprise an image and one or more labels of the image (e.g., an image depicting a cat and a bounding box associated with a region occupied by the cat within the image).

Neural network 300 may be configured to receive any set of numeric values representative of any feature and provide an output set of numeric values representative of the feature. For example, the inputs may comprise color values of a color image and outputs may comprise classifications for each pixel of the image. As another example, inputs may comprise numeric values for a time dependent trend of a parameter (e.g., temperature fluctuations within a building measured by a sensor) and output nodes 310 may provide a predicted value for the parameter at a future time based on the observed trends, wherein the trends may be utilized to train the neural network 300. Training of the neural network 300 may comprise providing the neural network 300 with a sufficiently large number of training input/output pairs comprising ground truth (i.e., highly accurate) training data. As a third example, audio information may be provided to input nodes 302 and a meaning of the audio information (e.g., identification of words) may be provided to output nodes 310 to train the neural network 300 to identify words and speech patterns.

Generation of the sufficiently large number of input/output training pairs may be difficult and/or costly to produce. Accordingly, most contemporary neural networks 300 are configured to perform a certain task (e.g., classify a certain type of object within an image) based on training pairs provided, wherein the neural networks 300 may fail at other tasks due to a lack of sufficient training data and other computational factors (e.g., processing power). For example, a neural network 300 may be trained to identify cereal boxes within images, however the same neural network 300 may fail to identify soap bars within the images.

As used herein, a model may comprise the weights of intermediate nodes 306 and output nodes 310 learned during a training process. The model may be analogous to a neural network 300 with fixed weights (e.g., constants a, b, c, d of Equation 1), wherein the values of the fixed weights are learned during the training process. A trained model, as used herein, may include any mathematical model derived based on a training of a neural network 300. One skilled in the art may appreciate that utilizing a model from a trained neural network 300 to perform a function (e.g., identify a feature within sensor data from a robot 102) utilizes significantly less computational recourses than training of the neural network 300 as the values of the weights are fixed. This is analogous to using a predetermined equation to solve a problem as compared to determining the equation itself based on a set of inputs and results.

As used herein, a neural network 300 may refer to a neural network as depicted in FIG. 3 (i.e., a fully connected network), a convolutional neural network, feed forward neural network, recurrent neural network, deep convolutional neural network, a generative adversarial network, support vector machines, long-short term memory ("LSTM") networks, auto encoder networks, and/or other conventional neural networks known within the art.

According to at least one non-limiting exemplary embodiment, a neural network 300 may comprise N dimensions for an N-dimensional feature (e.g., a 3-dimensional RGB input image comprises width and height dimensions and three color dimensions), wherein only one dimension has been illustrated for clarity. That is, constants a, b, c, d, and values $x_i$ may be tensors. Similarly, output nodes 310 may produce outputs of M dimensions. M being an integer number of features of which the neural network 300 is configured to identify for example, wherein the output may comprise a histogram of values corresponding to a certainty that a pixel or image as a whole depicts a feature of the histogram.

According to at least one non-limiting exemplary embodiment, input nodes 302 may include receptive fields for processing images. The receptive fields corresponding to one or more regions within input images. The input nodes 302 may produce outputs to links 304 based on the pixel data (i.e., color values) of their respective receptive fields. Cumulatively, the receptive fields of all input nodes 302 may cover the entire image space or a portion of the image space. The individual receptive fields may or may not overlap with each other.

According to at least one non-limiting exemplary embodiment, one or more outputs $k_{i,j}$ from intermediate nodes 306 of a $j^{th}$ intermediate layer 312 may be utilized as inputs to one or more intermediate nodes 306 an $m^{th}$ intermediate layer 312, wherein index m may be greater than or less than j (e.g., a recurrent or feed forward neural network). One skilled in the art may appreciate a plurality of other embodiments of a neural network 300, wherein the neural network 300 illustrated represents a simplified embodiment of a neural network to illustrate the structure, utility, and training of neural networks and is not intended to be limiting. The exact configuration of the neural network used may depend on (i) processing resources available, (ii) training data available. (iii) quality of the training data, and/or (iv) difficulty or complexity of the classification/problem. Further, programs such as AutoKeras utilize automatic machine learning ("AutoML") to enable one of ordinary skill in the art to optimize a neural network 300 design to a specified task or data set.

Figure 4A:
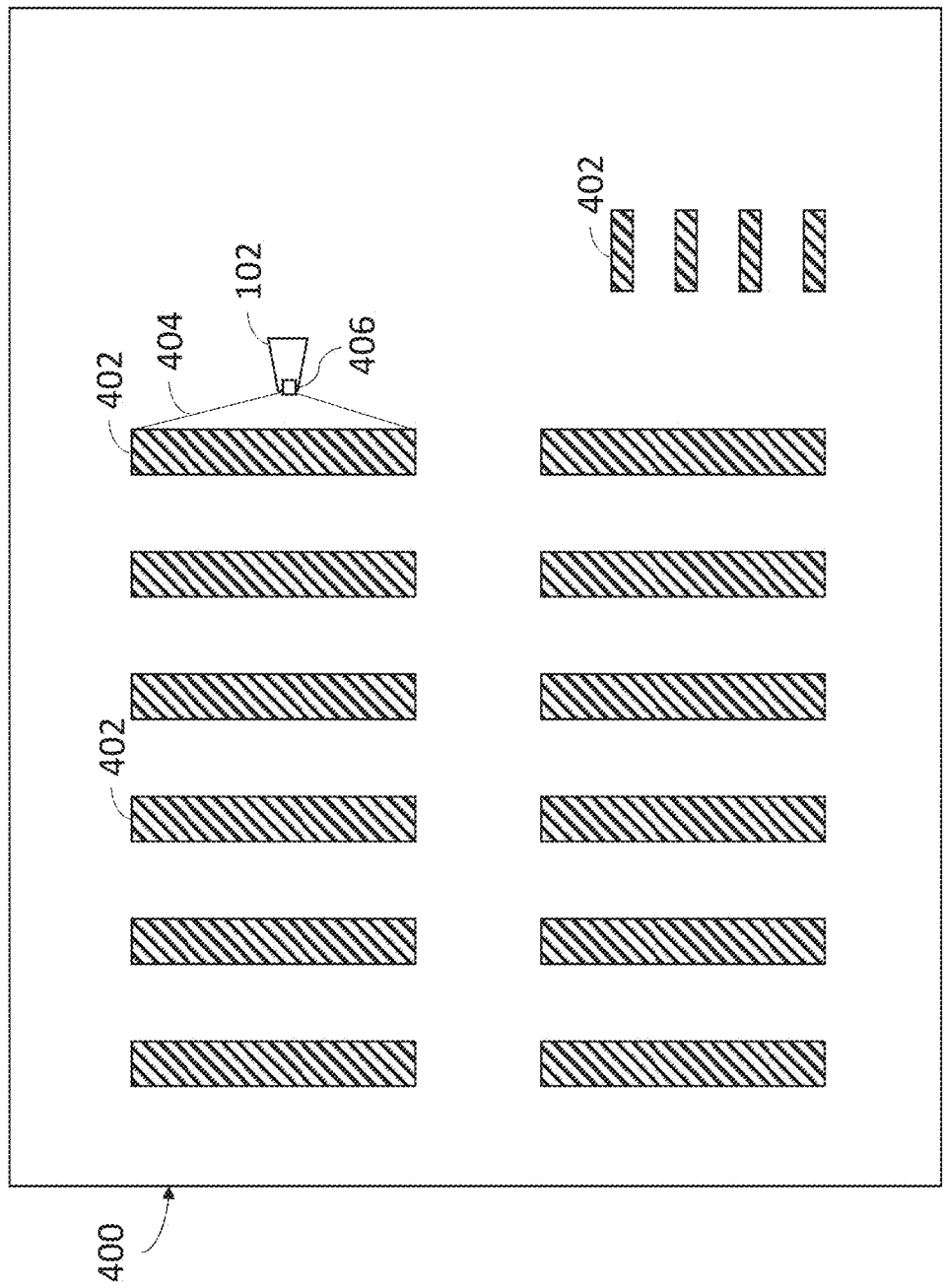
FIG. 4A is a top view of a robot using a sensor to measure features of an object, according to an exemplary embodiment.
Figure 4B:
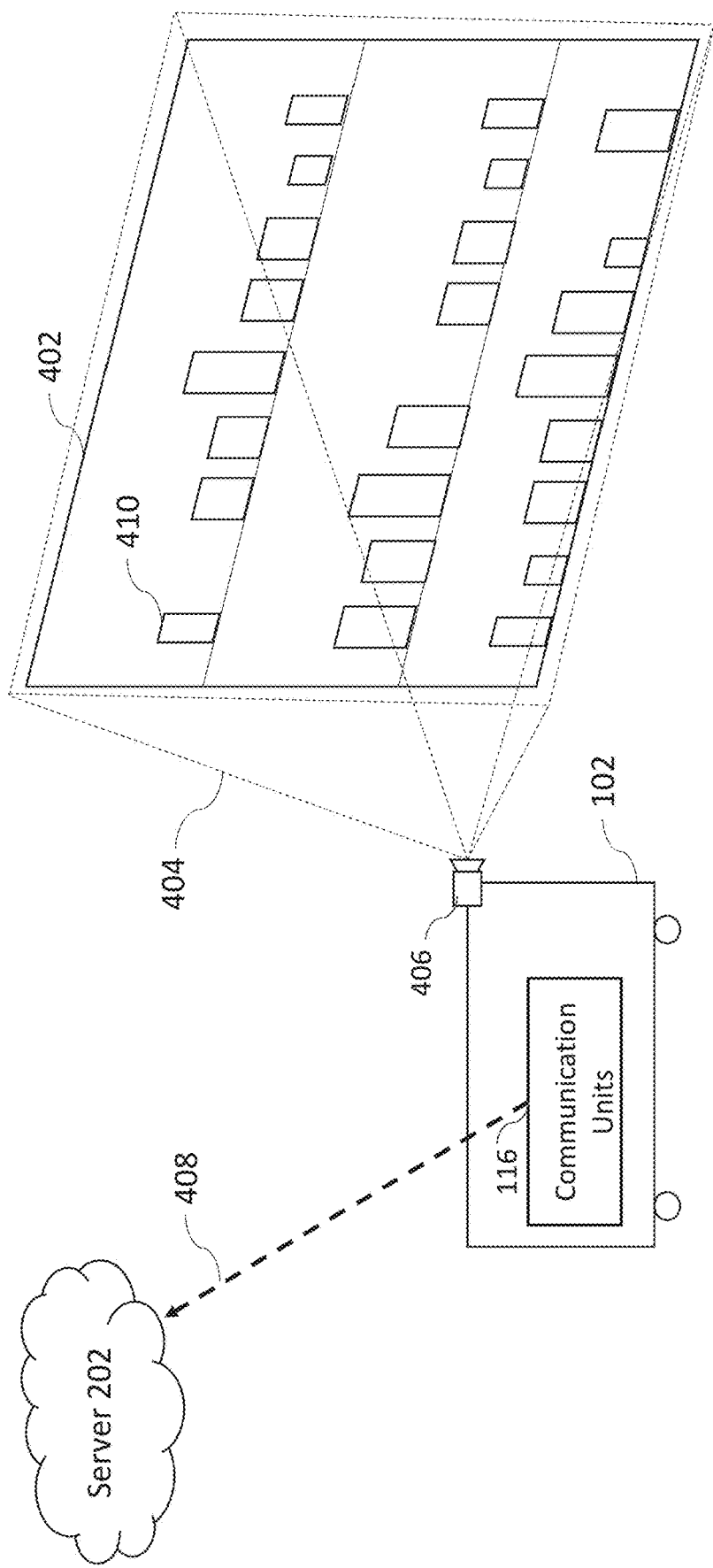
FIG. 4B is a side view of a robot using a sensor to measure features of an object and communicating the features to a cloud server, according to an exemplary embodiment.

Next. FIGS. 4A and 4B will be discussed. FIG. 4A illustrates a robot 102 within an environment 400 utilizing a sensor 406 to scan a feature of an object 402, according to an exemplary embodiment. Environment 400 may comprise, including but not limited to, a supermarket, warehouse, office building, hospital, or other space wherein the robot 102 operates. The robot 102 may comprise any robot configured for any function (e.g., a cleaning robot, a shelf-stocking robot, an autonomous wheelchair, etc.). A field of view 404 is illustrated for the sensor unit 406, wherein the robot 102 may be in any orientation to scan the object 402 without limitation. Objects 402 may comprise, without limitation, shelves of a store, objects in a warehouse, people and desks of an office building, beds in a hospital, and so forth.

FIG. 4B illustrates a detailed view of the robot 102 within the environment 400 illustrated in FIG. 4A above, according to an exemplary embodiment. The robot 102 may capture data of features 410 of the object 402 using a sensor 406. For example, sensor 406 may comprise an RGB imaging camera, wherein the feature 410 may be represented by certain pixel color values of RGB images captured by the camera. It is appreciated that features 410 of object 402 may comprise any feature of any object (e.g., a color of clothes on a human, spills on a floor, features of another robot 102, color of paint on a wall, writing on objects, etc.). The feature data 408 may be communicated to a server 202 using communications units 116 of the robot 102 (and additional relays/routers if necessary). The feature data 408 may comprise an RGB image of the object 402, a LiDAR point cloud scan of the object 402, or any other numeric representation of the object 402 and features 410 thereof measured by a sensor unit 114. The server 202 may process the received feature data 408 and output a signal 510 based on one or more insights 508 generated using the feature data 408, the output signal 510 being communicated to the robot 102 and/or other devices within the environment 400 and determined using a system illustrated in FIG. 5A next.

Figure 5A:
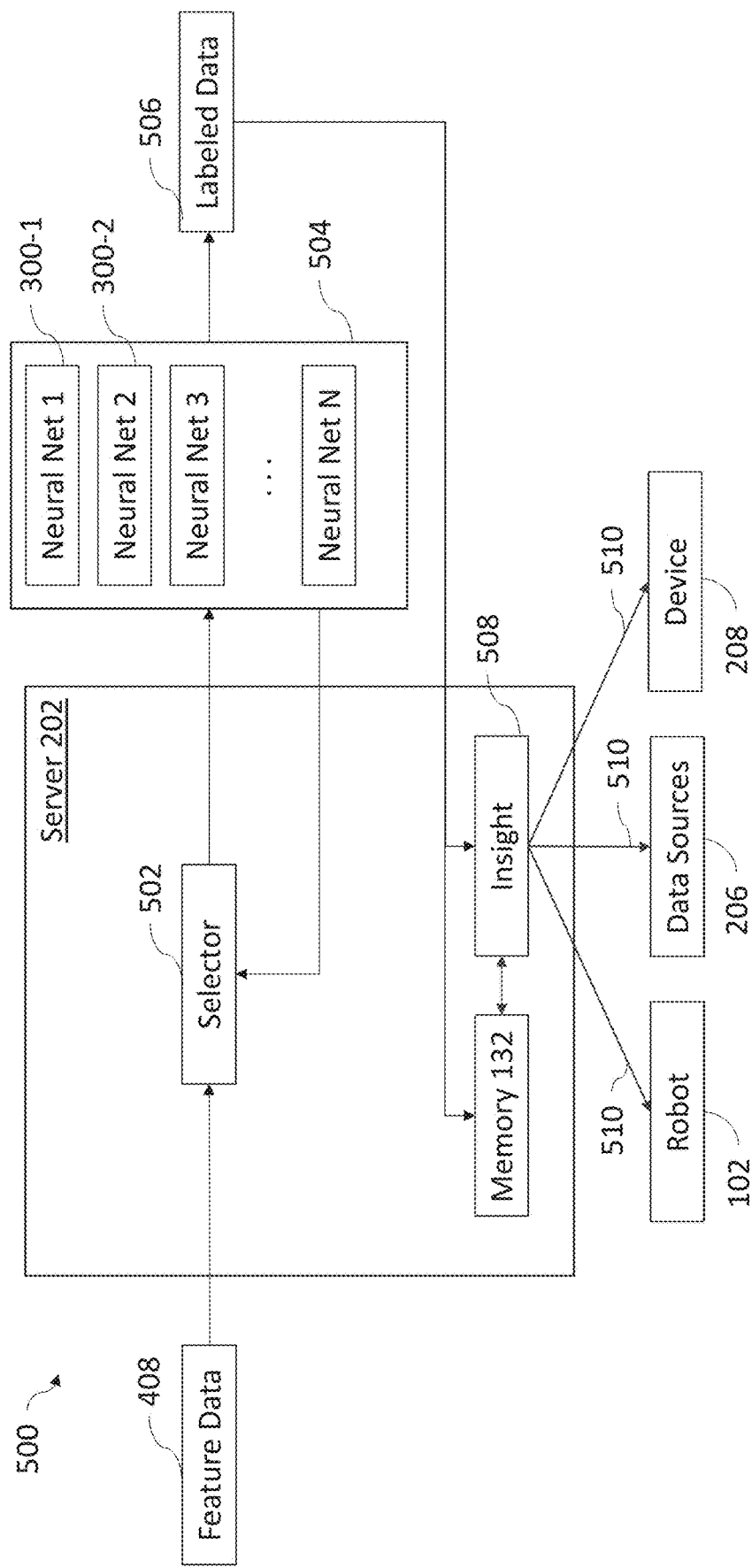
FIG. 5A is a functional block diagram of a system configured to identify features from feature data collected by one or more robots, according to an exemplary embodiment.

Referring now to FIG. 5A, a functional block diagram of a system 500 configured to receive feature data 408 from a robot 102 and generate an insight 508 is illustrated, according to an exemplary embodiment. It is appreciated that some or all functional blocks illustrated in FIG. 5A may be illustrative of computer-readable instructions executed by a processor, or distributed network of processors as discussed in FIG. 2 above, of the server 202. Feature data 408 may comprise any data (e.g., RGB color images, point cloud data. IMU data, etc.) collected by one or more robots 102 coupled to a server 202 representative of one or more features. The feature data 408 may be communicated to the server 202 and be received by a selector 502.

The selector 502 is configured to determine one or more neural networks 300, as discussed above with respect to FIG. 3, of a system of neural networks 504 that should receive the feature data 408. The system of neural networks 504 may comprise N neural networks 300. N being an integer number, wherein each respective neural network 300 is trained to perform a specific task such as, for example, identifying specific features of feature data 408 (e.g., identifying specific objects, such as soda, candy, cars, etc., in RGB images: identifying humans in point cloud scans: utilizing sensor data to predict a time dependent parameter at future times: etc.). The system of neural networks 504 may be internal to the server 202, external to the server 202, or a combination thereof. One skilled in the art would appreciate that selector 502 may correspond to a module or unit that pertains to computer-readable instructions that are capable of being executed by a processor.

The selector 502 may determine which neural network(s) 300 should or can receive the feature data 408 based on training processes associated with each neural network 300 of the system of neural networks 504. For example, if an input feature data 408 comprises a set of RGB (red, green, blue) images, the selector 502 may choose neural networks 300 configured to process RGB images (i.e., identify features within the RGB images, the features identified corresponding to a respective training process of a respective neural network 300) while filtering the feature data 408 from other neural networks 300 (e.g., neural networks 300 configured to process point cloud data).

According to at least one non-limiting exemplary embodiment, feature data 408 may further include panoramic images or images stitched/combined together to form a larger image. For example, an image sensor unit 114 of a robot 102 may capture images in 480×480 px resolution. Images provided to the server 202 may include images of N×480 px resolution, with N being an integer number proportional to the number of images stitched to form a panoramic image (e.g., N may be 1080, 2000, 5000, etc. pixels). Controllers 118 of robots 102 may utilize data from odometry units, such as speedometers, encoders, gyroscopes, and the like, to determine spatial displacement of the image camera such that panoramic images generated by the controller 118 are of high quality. To further enhance quality of the panoramic images, controller 118 may cause robot 102 to navigate in a substantially straight line path at a constant velocity (provided no obstacles impede the robot 102 movement) and only stitch/combine images into a panoramic image when the robot 102 navigates in the straight line path (i.e., the panoramic images may not include images captured while the robot 102 is turning).

According to at least one non-limiting exemplary embodiment, context data associated with the feature data 408 may be further utilized to determine one or more neural networks 300 configured to receive and process the feature data 408. Context data may comprise any data associated with the feature data 408 which provides context including, without limitation, localization data, navigation data, timestamp data, feature data 408 from other sensor units 114, data format (e.g., matrix, array, binary value(s), image, etc.) of the feature data 408, historic data (e.g., features detected at the location in the past), planogram maps (i.e., maps which detail which products (i.e., features) should be expected at certain locations), and so forth collected by a robot 102. For example, if feature data 408 arrives from a robot 102 operating within a supermarket, the selector 502 may select neural networks 300 configured to identify humans, items sold by the supermarket, spills on a floor, and/or other features associated with the supermarket while not communicating the feature data 408 to neural networks 300 configured to identify, for example, weather patterns, trees, or other features not present in typical supermarkets. As another example, a robot 102 operating within a store may utilize a planogram map and a current position of the robot 102 within the store to determine which planogram is associated with a display of which the robot 102 is scanning/sensing (e.g., dog food, soap, produce, etc. displays) such that a selector 502 may output the feature data 408 to one or more neural networks 300 configured to identify features of the associated planogram, the localized planogram corresponding to context data.

According to at least one non-limiting exemplary embodiment, a selector 502 may receive external communications corresponding to one or more neural networks 300 configured to receive and process feature data 408. For example, the system of neural networks 504 may be illustrative of a plurality of neural networks 300 trained by respective analytics companies or artificial intelligence companies (e.g., Scandit, Neurala, Chooch Intelligence Technologies, Figure Eight Inc., Dynam.AI, etc.), wherein each company may train one or more neural networks 300 for one or more specific tasks (e.g., identifying a certain set of features). These companies, embodied by servers external to server 202, may desire feature data 408 from one or more robots 102 and/or robot networks 210 as the feature data 408 may be localized based on a position of the one or more robots 102 during acquisition of the feature data 408. For example, an analytics company may train one or more neural networks 300 to identify and read barcodes, wherein the company may request feature data 408 from robots 102 operating within retail spaces. The selector 502 may receive a request from the company for feature data 408 from one or more robots 102 and/or robot networks 210 within retail spaces and output feature data 408 to a respective one or more neural networks 300 of the company.

According to at least one non-limiting exemplary embodiment, wherein the system of neural networks 504 is illustrative of, at least in part, neural networks 300 trained by analytics companies, the selector 502 may be further configured to receive permissions from a host 204 of the server 202 to determine which neural networks 300 may receive feature data 408. For example, the host 204 may restrict access to feature data 408 from a company unless the company pays (e.g., the host 206 and/or owner of robots 102 collecting feature data 408) for the feature data 408.

According to at least one non-limiting exemplary embodiment, wherein the system of neural networks 504 is illustrative of, at least in part, neural networks 300 trained by analytics companies, the server 202 may notify one or more companies about an arrival of new feature data 408. The companies notified correspond to analytics companies which develop neural networks 300 trained to process feature data 408. For example, an analytics company may train a neural network 300 to identify humans, wherein the company may be notified when feature data 408 is received by the server 202 from a robot 102 operating within an environment comprising humans (e.g., a warehouse, supermarket, etc.).

According to at least one non-limiting exemplary embodiment, processors 130 of server 202 may communicate feature data 408 to all of the neural networks 300 configured to process the feature data 408 upon the server 202 receiving the feature data 408. For example, if server 202 receives an RGB image, the server 202 may communicate the RGB image to all neural networks 300 configured to process RGB images to detect any features, regardless of what features the neural networks 300 are trained to identify. The selector 502 may receive outputs from the neural networks 300 and select the best result, wherein the best result may be determined based on a confidence measure output by the neural networks 300 for a respective prediction. For example, a first neural network 300 may identify a cat within an RGB image with an uncertainty of 1% while a second neural network 300 may identify a dog in the same RGB image with an uncertainty of 60%, wherein selector 502 may determine that the RGB image depicts a cat. In some instances, the selection may be further based on data collected by the robot 102 such as its location. Following the previous example, if the robot 102 had previously observed cats at the location the RGB image was captured, then the selector 502 may use the historic data and robot 102 position to further determine the RGB image depicts a cat and not a dog. The determination of a correct result based on uncertainty measures and other data collected by robots 102 is further illustrated in FIG. 12-14 below.

In short, the selector 502 is configured to provide a filtering of the input feature data 408 such that all N neural networks 300 are not required to process all feature data 408 received by the server 202, thereby reducing a computational load imposed on the system of neural networks 504. An exemplary implementation of the selector 502 as a look-up table is illustrated below in FIG. 6, however a plurality of embodiments of a selector 502 are considered and appreciated by one skilled in the art.

One skilled in the art may appreciate that use of a selector 502 is not indented to be limiting as the feature data 408 may be provided to every neural network 300 of the system of neural networks 504 provided sufficient processing resources are available. If a neural network 300 receives feature data 408 comprising features of which the neural network 300 is not configured (i.e., trained) to detect, the neural network 300 may output a negative detection (i.e., features are not detected within feature data 408) or provide an output with a high associated variance (e.g., exceeding a threshold value). For example, a neural network 300 configured to identify humans may output no detection of humans if feature data 408 comprises an image with no humans depicted therein. Accordingly, in embodiments of system 500 which do not comprise selector 502, some filtering of outputs from the system of neural networks 504 may, in some instances, be required (e.g., selecting only positive detection outputs and/or insightful negative detections, such as detecting missing items on a store shelf) as appreciated by one skilled in the art.

The system of neural networks 504 may output labeled data 506 corresponding to values at output nodes 310 of each respective neural network 300 which received feature data 408 from selector 502. The labeled data 506 may comprise, without limitation, annotated images (e.g., identified stock keeping unit ("SKU") of items, detection of a spill on a floor, humans, etc.), predicted parameter values of temporal or spatially dependent parameters, and/or objects identified in point clouds. The labeled data 506 may be communicated back to the server 202, wherein the server 202 may utilize the labeled data 506 to generate at least one insight 508. An insight 508, as used herein, may comprise any parameter, value, localized feature, or other information measured or inferred based on the labeled data 506 outputs from one or more neural networks 300. In some instances, the labeled data 506 may comprise an insight 508 in itself (e.g., a predicted value of a time-dependent parameter). Insights 508 may comprise, for example, localized items in a store, the items being identified by the neural networks 300 and localized within the store based on a position of a robot 102 during acquisition of the feature data 408. Insights 508 may comprise inferred data such as, for example, predicting a crowd of people within a region of environment based on observing a time-dependent trend of people crowding within the region based on feature data 408 collected over a period of time (e.g., a week or longer). Insights 508 may comprise measurements based on labeled data 506, such as measuring a size of a certain object identified in a point cloud by one or more neural networks 300. In short, insights 508 may comprise any data generated by a processor of the server 202, or distributed network of processors coupled thereto, executing computer-readable instructions to process labeled data 506 from the system of neural networks 504 in any way. These insights 508 may be stored on a memory 132 of the server 202, external data sources 206, memories 120 of robots 102, and/or devices 208.

The server 202 may utilize insights 508 generated from feature data 408 to emit, transmit or output a signal 510 to one or more of robots 102 of one or more robot networks 210, data sources 206, and/or devices 208 coupled to the server 202, as discussed above with respect to FIG. 2. The signal 510 may comprise, without limitation, one or more insights 508, a command for a robot 102 to execute (e.g., a motion command, sequence of computer-readable instructions to execute, etc.), a notification to a device 208 (e.g., notification to a cell phone based on one or more identified features), data to be stored within a data source 206 (e.g., a database), and so forth. In some instances, signal 510 may be communicated to one or more networks 210 coupled to the server 202 as a whole, wherein every robot 102 of the respective one or more networks 210 may receive the signal 510 (e.g., all robots 102 of a network 210 within a retail space may receive signal 510 comprised of detection and localization of people within the retail space such that the robots 102 may plan routes around the people accordingly). In other instances, it may be beneficial to only communicate insights 508 to specific robots 102 of respective networks 210 (e.g., signal 510 may configure a specific robot 102 of a network 210 to perform a certain task while other robots 102 of the same network 210 are not configured to perform the task).

It is appreciated that signal 510 may not be emitted, transmitted or outputted during every acquisition of feature data 408, however an insight 508 and/or an update to a preexisting insight 508, based on new feature data 408 inputs, may be generated during every acquisition of feature data 408. Stated differently, the signal 510 may only be transmitted or outputted selectively, for example, after a certain predetermined duration of time in order to conserve processing speed, reduce communications bandwidth occupied by signal 510, and increase efficiency.

According to at least one non-limiting exemplary embodiment, feature data 408 may comprise data from sensor units 114 of robots 102 of a network 210 collected over a period of time and uploaded as a single package. For example, networks 210 may upload data collected by robots 102 on the network 210 at designated times of day (e.g., during idle times of the robots 102). In other words, each network 210 may synchronize with the server 202 by uploading feature data 408 collected by robots 102 of the network 210 all at once. The signals 510 may be emitted to respective networks 210 during the synchronization or may be emitted to the respective networks 210 at any time, without limitation.

According to at least one non-limiting exemplary embodiment, robots 102 may continuously upload (i.e., stream) feature data 408 to the server 202. According to another embodiment, robots 102 may upload feature data 408 in bundles comprising an aggregate of data collected over time.

According to at least one non-limiting exemplary embodiment, insights 508 may be utilized to generate additional, or a plurality of, insights 508 based on new feature data 408 collected by one or more robots 102. For example, insights 508 may comprise localized items within a store, wherein a robot 102 may upload feature data 408 comprising an image of a shelf within the store. Using the selector 502 and system of neural networks 504, items on the shelf may be identified and localized within the store to generate an insight 508 comprising a map of the localized items within the store. Prior insights 508 may be utilized to determine if one or more items are missing, misplaced, or have otherwise changed position based on comparing the current map (i.e., an insight 508 generated based on new feature data 408) to a prior map (i.e., prior insights 508).

According to at least one non-limiting exemplary embodiment, insights 508 may be utilized to generate a computer-readable map of identified features within respective environments of one or more robots 102. For example, the system of neural networks 504 may identify items (i.e., features) within feature data 408 comprising images taken within a supermarket, store, warehouse, or other environment. Using the identified items, a position of the respective robots 102 during acquisition of the feature data 408, and other conventional localization and mapping methods, the items may be localized and mapped on a computer-readable map. Use of these maps is further illustrated in exemplary implementations of the systems and methods of this disclosure with respect to FIG. 7-11 below. It is appreciated by one skilled in the art that use of robots 102 to collect feature data 408 is advantageous over conventional methods of collecting feature data 408 (i.e., using humans) as robots 102 may localize themselves accurately and at all times during operation such that identified features may thereby be localized. Additionally, robots 102 may navigate a single route multiple times per day and/or at consistent times during a day such that temporal changes in features may be constantly identified and monitored.

Figure 4C:
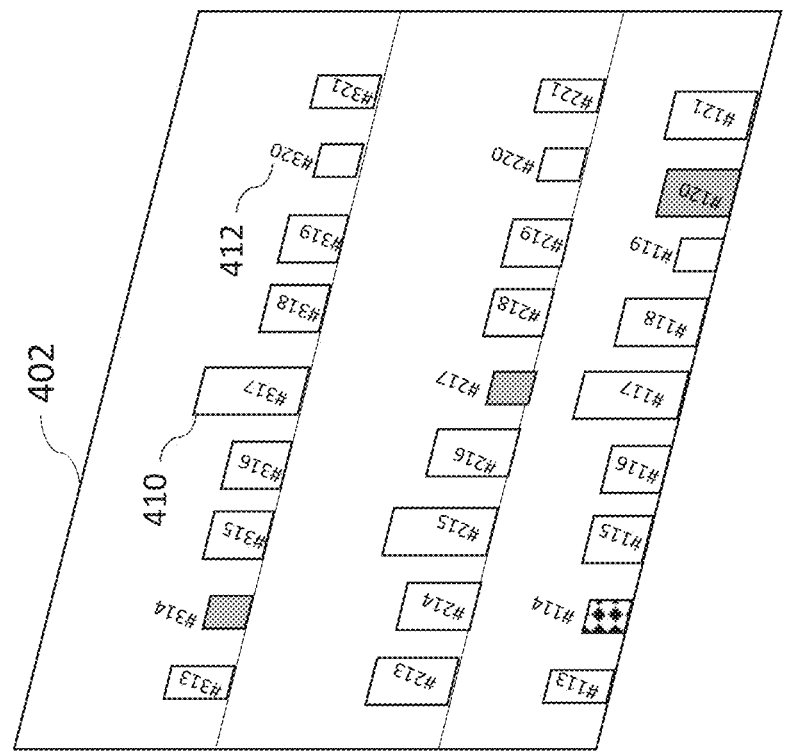
FIG. 4C is a side view of a robot receiving a signal from a cloud server comprising identifications of features of an object, according to an exemplary embodiment.
Figure 4C:
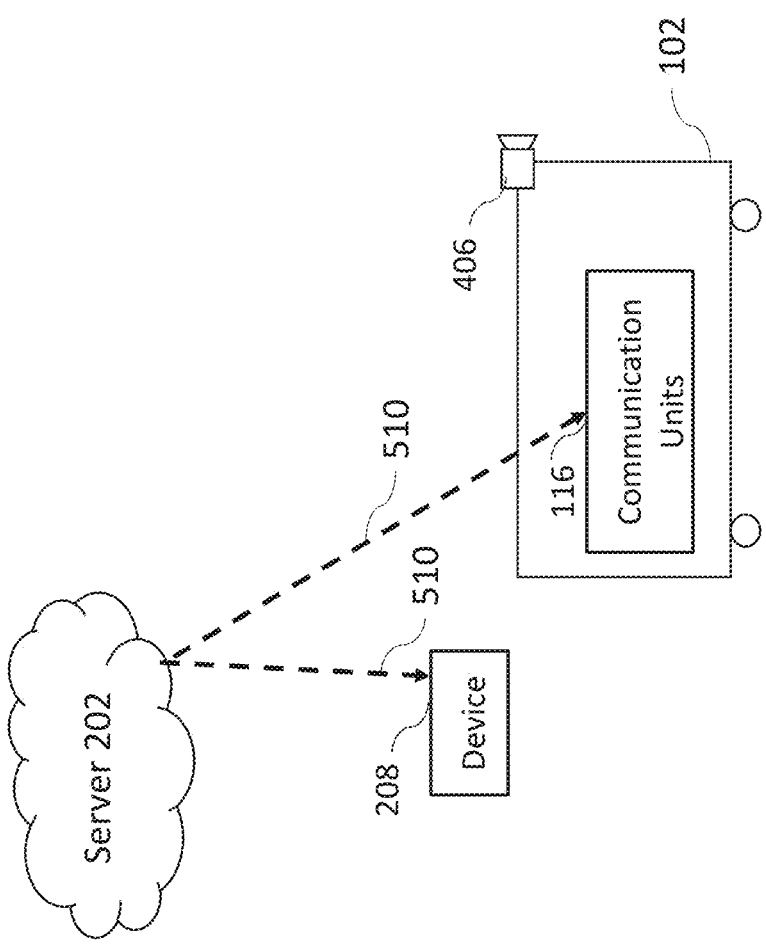

Returning now to FIG. 4C. FIG. 4C illustrates a robot 102, illustrated in FIGS. 4A-B above, receiving a signal 510 from a server 202 using communication units 116, according to an exemplary embodiment. The signal 510 may comprise an insight 508 or may be based on the insight 508, the insight 508 being based on feature data 408 communicated to the server 202 by the robot 102, as illustrated in FIG. 4B above. A system 500, illustrated in FIG. 5A, may process the feature data 408 following a method 512 of FIG. 5B below to generate one or more insights 508 which may be further utilized by the server 202 to generate the signal 510.

In the exemplary embodiment illustrated, the robot 102 may upload feature data 408 to the server 202, the feature data 408 comprising, for example, an RGB image of a shelf 402 within a store 400, wherein the returned signal 510 may comprise product SKU numbers 412 of features 410 (i.e., items) of the RGB image, which may therefore be localized on the shelf 402. One or more neural networks 300 of a system of neural networks 504 may be configured to identify the product SKU numbers 412 and further configured to encompass each item within a bounding box (not shown) or other method of localizing each item on the shelf 402 (e.g., pixel-wise image segmentation). The robot 102 may localize the shelf 402 within a store such that each feature 410 may therefore be localized within the store, wherein the localization data may be stored on a computer-readable map. The controller 118 may utilize a camera projection matrix stored in memory 120 to localize the identified features in 3-dimensional space. In some instances, controller 118 may further utilize data from other exteroceptive sensor units 114, such as LiDAR sensors, to localize the features.

The signal 510 may further comprise an insight 508 communicated to the robot 102 and/or a separate device 208 such as, for example, a cell phone of an associate of the store. The insight 508 may comprise identification of one or more missing items on the shelf 402, such as SKU #120. #217, and #314 (illustrated in grey). The insight 508 may further comprise an identification of a misplaced item #114 (illustrated with a pattern). The server 202 may determine the missing items and the misplaced item(s) based on comparing the feature data 408 of the shelf 402 to a planogram of the shelf 402 and/or historic data which indicates that the item #114 was previously found at the location where it is currently missing. The signal 510 to the device 208 or robot 102 may prompt/configure either the owner of the device 404 (e.g., a store associate) and/or the robot 102 to move the misplaced item to a proper location and/or restock the missing items.

Figure 7:
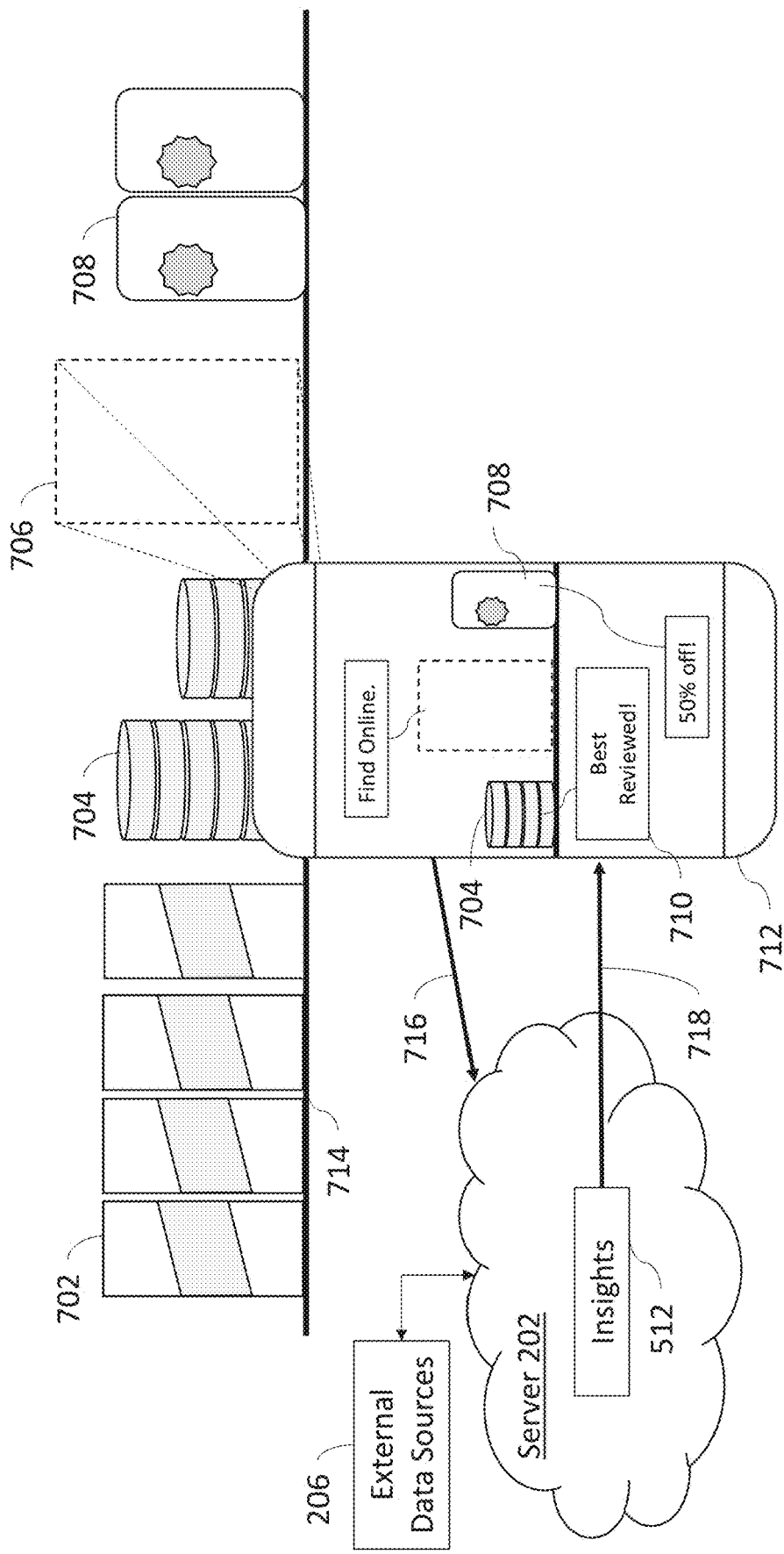
FIGS. 7-9 illustrate exemplary implementations of the systems and methods of this disclosure for shelf analytics within supermarkets, according to exemplary embodiments.
Figure 8:
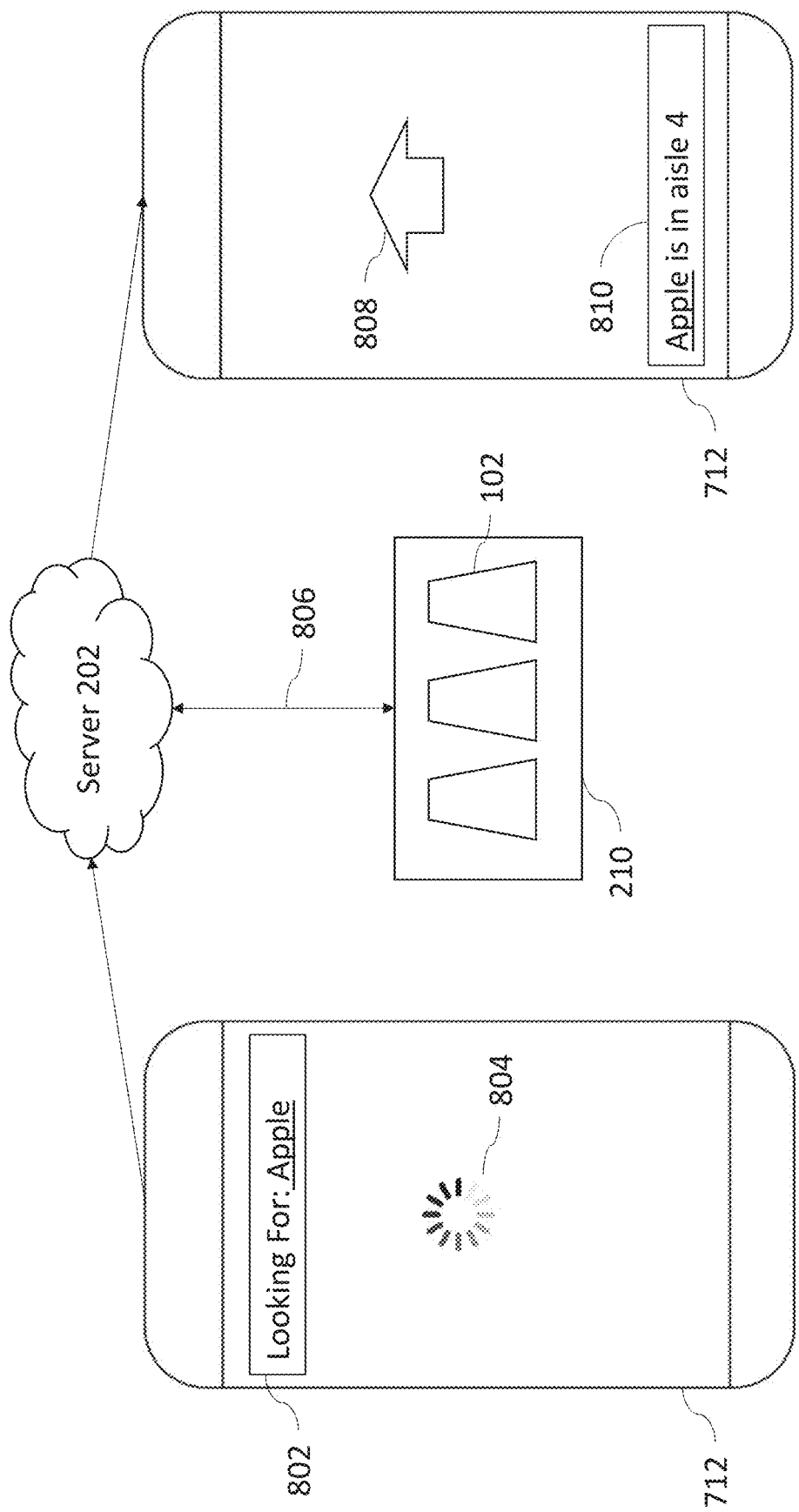

It is appreciated that, by localizing the object 402 and features 410 thereof, the robot 102 and/or server 202 may map the object 402 and respective features 410 thereof on a computer-readable map. This computer-readable map may be utilized by robots 102 and/or other devices 208 to enhance functionality of robots 102 (e.g., by enhancing feature identification using many neural networks 300) among other benefits further illustrated in FIG. 7-10 below. Computer-readable maps comprising mapped features 410 therein may be accessed, for example, by an application (e.g., on a cell phone, a mobile device or a computer) such that a user of the application may localize a desired feature within an environment of the robots 102 (e.g., localizing an apple within a supermarket, as illustrated in FIG. 8). Computer-readable maps of localized features 410 may be considered as insights 508. In some embodiments, the computer-readable maps may be three dimensional and enable humans to virtually tour the environment via accessing and navigating through the three dimensional map.

Advantageously, use of a distributed network of feature data 408 collection using robots 102 that accurately localize themselves and consistently upload new feature data 408 during operation, may enable a server 202 to map (i.e., localize) features of the feature data 408 onto computer-readable maps with high precision. Additionally, use of a distributed network of neural networks 300 may further enhance capabilities of the server 202 to identify a substantial number of features and, for example, localize and map the features onto a computer-readable map. Contemporary methods of feature identification without robots 102, such as by humans, may yield poor localization data of the features, preventing mapping of the features onto an accurate computer-readable map. Further, without a use of a distributed system of neural networks 504, many features may be left unidentified as training a few neural networks 300 to identify a substantial number of features may correspond to a lengthy and costly training process (e.g., there may be 50.000 items in a store, and one neural network 300 may fail to identify many of these items without a substantial number (i.e., hundreds of thousands or millions) of training input/out pairs as well as a plurality of intermediate layers 314 further adding to computational complexity).

Figure 5B:
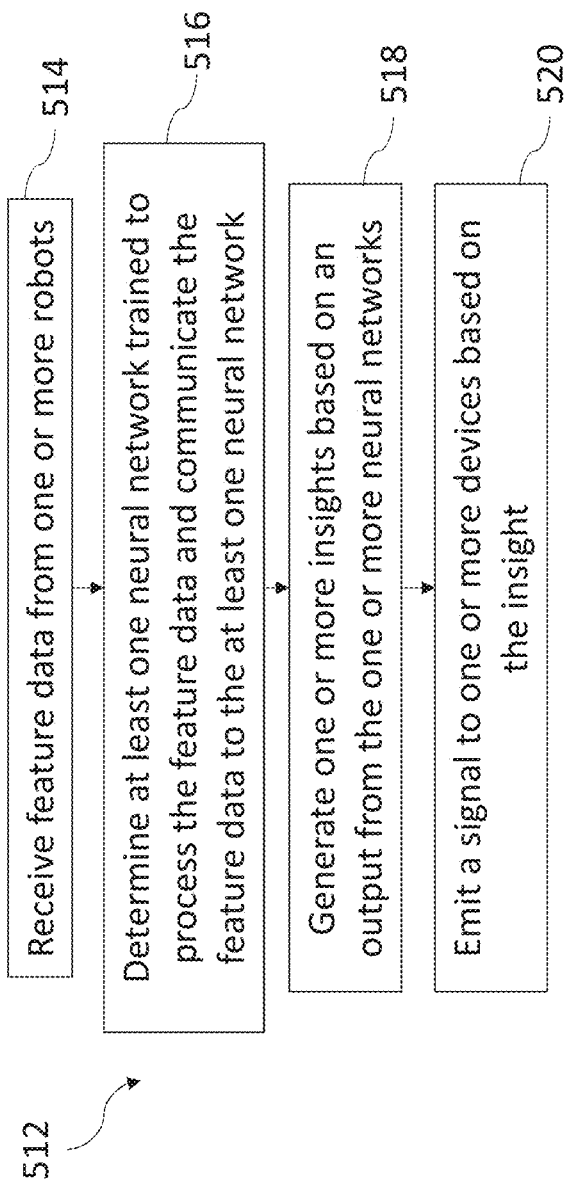
FIG. 5B is a process flow diagram illustrating a method for the system illustrated in FIG. 5A to produce an insight based on received feature data, according to an exemplary embodiment.

Referring now to FIG. 5B which is a process flow diagram illustrating a method 512 for a server 202, comprising a system 500 illustrated in FIG. 5A above, to generate a signal 510 based on an insight 508, the insight 508 generated from feature data 408 collected by one or more robots 102, according to an exemplary embodiment. Any steps described herein performed by the server 202 are performed by a processor 130 of the server 202, robots 102 of robot networks 210, and/or devices 208 executing computer-readable instructions from a non-transitory memory, as appreciated by one skilled in the art and discussed above with reference to FIG. 2.

Block 514 illustrates the server 202 receiving feature data 408 from one or more robots 102. The feature data 408 may comprise, without limitation. RGB images, point cloud data, measurements from IMUs (e.g., gyroscope measurements), any feature data 408 in examples discussed herein, and/or any parameters measured by the robot 102.

Block 516 illustrates the server 202 determining at least one neural network 300, of a system of neural networks 504, trained to process the feature data 408 and communicating the feature data 408 to the respective neural networks 300. A plurality of methods may be utilized to determine which neural network 300 is configured to process the feature data 408 as appreciated by one skilled in the art. Some exemplary methods for determining which neural network 300 is configured to process the feature data 408 will be illustrated, without limitation, below. This determination of block 516 may be determined by a selector 502 of a system 500 illustrated in FIG. 5A above: the selector 502 may be illustrative of one or more processors of the server 202 executing computer-readable instructions.

According to at least one non-limiting exemplary embodiment, context data associated with the feature data 408 may be utilized to determine one or more neural networks 300 configured to receive and process the feature data 408. Context data may comprise any data associated with the feature data 408 which provides context including, without limitation, localization data, navigation data, timestamp data, data from external data sources 206 (e.g., inventory/sales data), feature data 408 from other sensor units 114, data format (e.g., matrix, array, binary value(s), image, etc.) of the feature data 408, historic information, and so forth. For example, if feature data 408 arrives from a robot 102 operating within a supermarket, the selector 502 may select neural networks 300 configured to identify humans, items sold by the supermarket, spills on a floor, and/or other features associated with the supermarket while not communicating the feature data 408 to neural networks 300 configured to identify, for example, weather patterns, trees, or other features not present in the supermarket. As another example, a robot 102 operating within a store may utilize a planogram map, historic information (i.e., locations of identified features detected in the past), and a current position of the robot 102 within the store to determine which planogram is associated with a display which the robot 102 is scanning/sensing (e.g., dog food, soap, produce, etc. displays) such that a selector 502 may output the feature data 408 to one or more neural networks 300 configured to identify features of the display associated with the planogram of the display, the localized planogram corresponding to context data.

According to at least one non-limiting exemplary embodiment, a server 202 may receive external communications from the system of neural networks 504 corresponding to one or more neural networks 300 configured to receive and process feature data 408. For example, the system of neural networks 504 may be illustrative of a plurality of neural networks 300 trained by respective analytics companies or artificial intelligence companies (e.g., Scandit, Neurala, Chooch Intelligence Technologies. Figure Eight Inc., Dynam.AI, etc.), wherein each company may train one or more neural networks 300 for one or more specific tasks (e.g., identifying a certain set of features). These companies may request feature data 408 from one or more robots 102 and/or robot networks 210. For example, an analytics company may train one or more neural networks 300 to identify and read barcodes, wherein the company may request feature data 408 from robots 102 operating within retail spaces. The server 202 may receive the request from the company for feature data 408 from one or more robots 102 and/or robot networks 210 operating within retail spaces and output feature data 408 to a respective one or more neural networks 300 of the company.

According to at least one non-limiting exemplary embodiment, wherein the system of neural networks 504 is illustrative of, at least in part, neural networks 300 trained by analytics companies, the determination by the server 202 in block 516 may be further based on permissions from a host 204 of the server 202. The permissions may restrict feature data 408 from one or more neural networks 300 of the system of neural networks 504. For example, the host 204 may restrict access to feature data 408 from an analytics company unless the company pays or compensates. e.g., the host 204 and/or owner of robots 102 collecting feature data 408.

According to at least one non-limiting exemplary embodiment, wherein the system of neural networks 504 is illustrative of, at least in part, neural networks 300 trained by analytics companies, the server 202 may notify one or more companies about an arrival of new feature data 408 and a location corresponding to a location of a robot 102 during acquisition of the new feature data 408. The companies notified correspond to analytics companies which develop neural networks 300 trained to process feature data 408 for a specific purpose. For example, an analytics company may train a neural network 300 to identify humans, wherein the company may be notified when feature data 408 is received by the server 202 from a robot 102 operating within an environment comprising humans (e.g., a warehouse, a supermarket, a museum, etc.).

Block 518 illustrates the cloud server generating one or more insights 508 based on an output received from the one or more neural networks determined in block 516. The outputs may comprise labeled data 506 illustrated in FIG. 5A corresponding to, without limitation, identified features within the feature data 408, predicted parameter values for spatial or time dependent trends, and/or any other output of output nodes 310 of the selected one or more neural networks 300. The insights 508 may comprise any parameter, data, value(s) (e.g., binary, floating point, integer, etc.), or other measured or inferred information from the outputs of the selected one or more neural networks 300. As an example, an insight 508 may comprise a computer-readable map with feature data 408 localized thereon, the localization being based on the identified features by the system of neural networks 504 and a location of a robot 102 during acquisition of the feature data 408.

Figure 13:
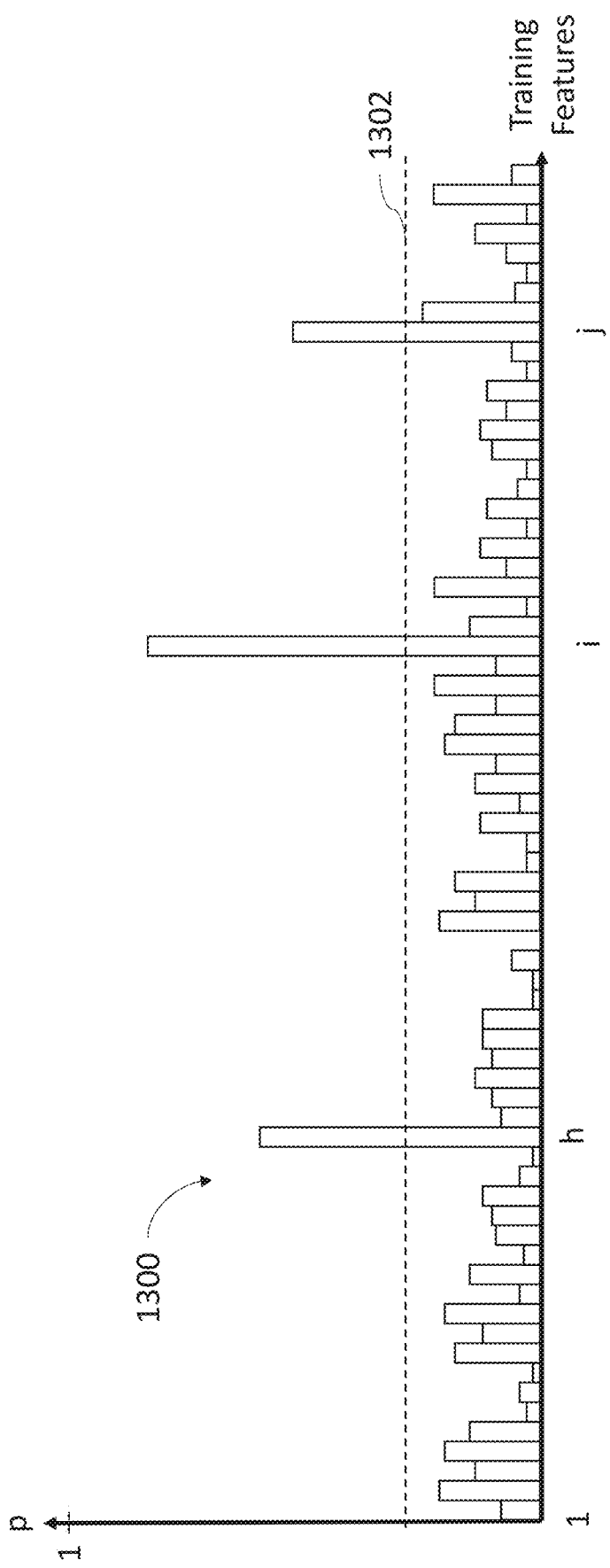
FIG. 13 illustrates historic feature data for a given location, according to an exemplary embodiment.
Figure 14:
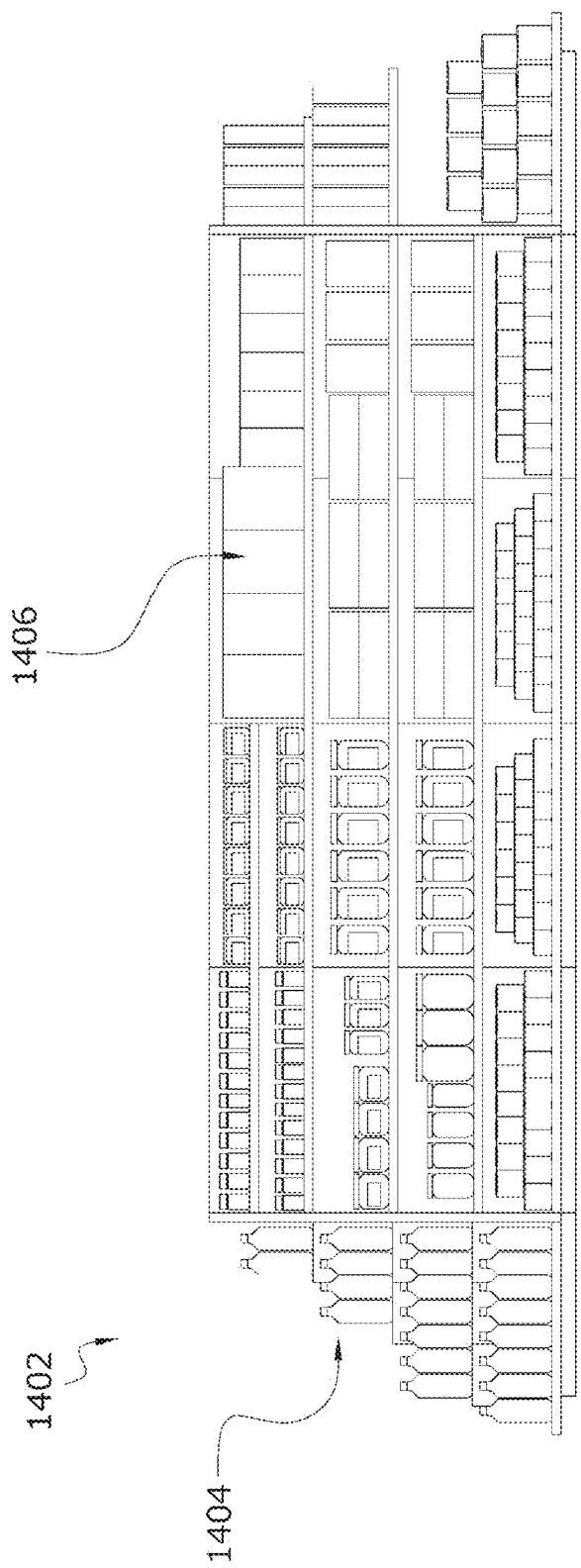
FIG. 14 illustrates a planogram map, according to an exemplary embodiment.

In some instances, the system of neural networks 504 may identify a feature as being equally likely to be feature A or feature B. For example, two neural networks 300 may, with equal uncertainty, identify a feature as being both cereal and oatmeal. To what the detected feature is, the server 202 may utilize additional context data to make the determination. For example, historic trends may be utilized. FIG. 13 illustrates a histogram of historic features detected at a certain location, wherein features h, i, and j were frequently detected at the location. If feature, for example, h is cereal and feature i and j are soap and detergent, then based on the labeled data 506 and historic trends, the server 202 may select that the identified feature is cereal. In some instances, the context data may include planogram data. FIG. 14 illustrates a planogram 1402, according to an exemplary embodiment. The planogram may correspond to a layout detailing which products are to be displayed at certain locations. The planogram may include soda 1404 and cereal 1406. Further, the planogram 1402 details the specific location where the features 1404, 1406 should be detected. Accordingly, based on the planogram 1402, the identified feature may be determined by the server 202 to correspond to cereal 1406 if the feature was detected in a substantially similar location.

Figure 9:
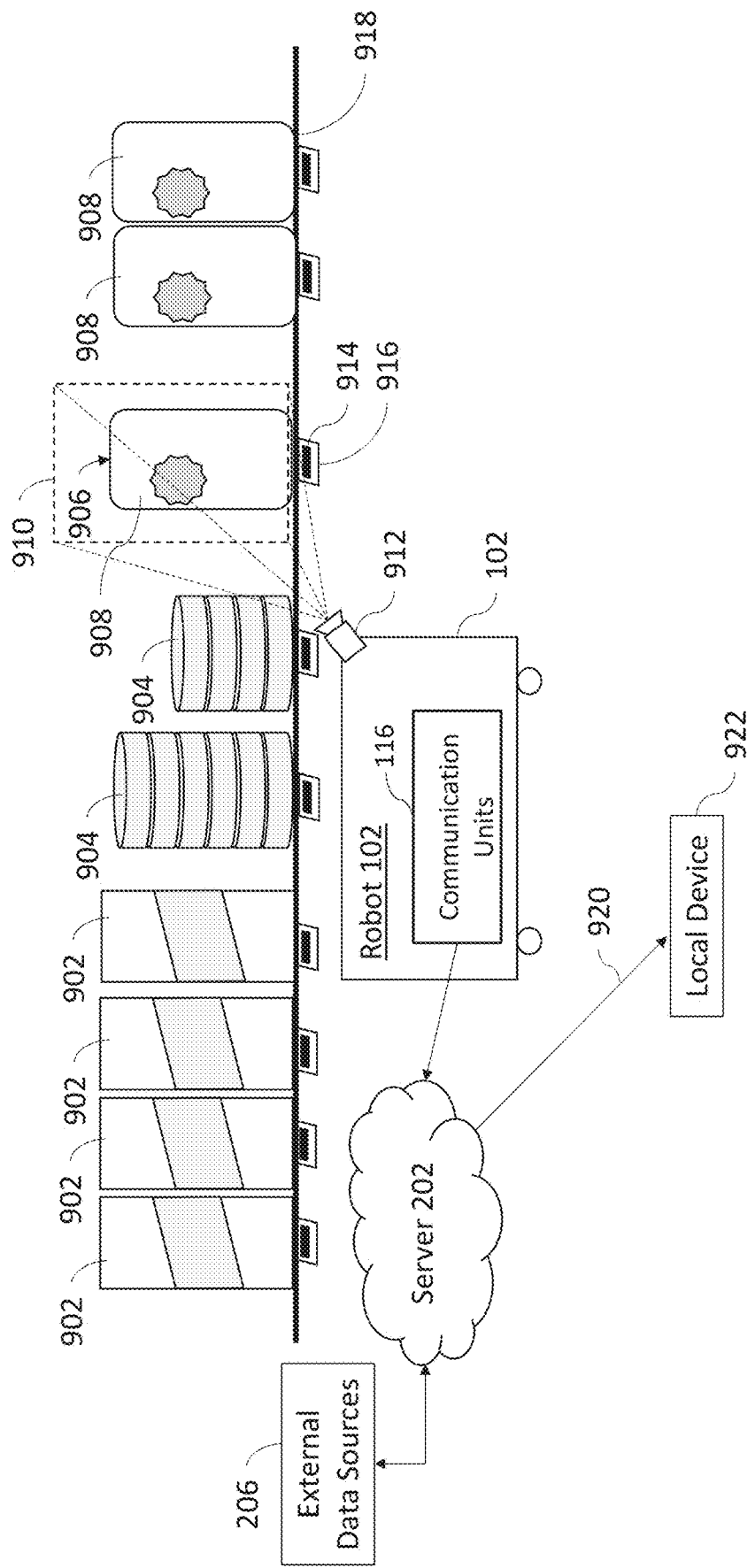

Returning now to FIG. 5, block 520 illustrates the server 202 emitting, transmitting or outputting a signal 510 to one or more devices based on the insight. The one or more devices may comprise one or more robots 102, devices 208, host 204, and/or external databases 206. The emitted signal 510 may configure one or more robots 102 to execute a task (e.g., by activating an actuator unit 108) or execute computer readable instructions on respective controllers 118. The emitted signals 510 may be received by devices 208 such as, for example, cell phones or workers or customers within stores, as illustrated in FIG. 7-9 below, wherein the signals 510 may comprise alerts or notifications to the devices 208.

According to at least one non-limiting exemplary embodiment, a signal 510 may be based on both an insight 508 generated by the feature data 408 and insights 508 generated in the past based on feature data 408 collected in the past (e.g., observing a change in position of a feature over time based on feature data 408 collected over a period of time). According to at least one non-limiting exemplary embodiment, a signal 510 may not be emitted during every generation of an insight 508 such as, for example, if the insight 508 does not require a task to be performed by a robot 102 or may require additional feature data 408 to determine a task to be performed by a robot 102.

Advantageously, use of the system 500 of FIG. 5A and method 512 described above may configure a server 202 to identify features 410 from feature data 408 collected by a plurality of robots 102 to generate insights 508. Stated differently, the systems and methods disclosed above enable a server 202 to collect a substantial amount of feature data 408 using a distributed network of robots 102 and process the feature data 408 using a distributed network of neural networks 504. Use of a distributed network of robots 102 overcomes contemporary problems with identification and localization of a large number of features as robots 102 may consistently and accurately capture feature data 408 as the robots 102 operate and localize themselves, whereas contemporary solutions comprise using a human associate to capture feature data 408 (e.g., using a camera) which may be costly from a time and labor perspective. Further, use of a plurality of specially trained neural networks 300 enhances insights 508 generated by a server 202 as multiple neural networks 300 may determine multiple features of the feature data 408. Each of the multiple features corresponds to a feature of which a respective neural network 300 is trained to identify, thereby reducing a cost (e.g., time, monetary, and/or labor costs) to train a single neural network 300 to identify every feature of every environment in which robots 102 operate.

The above FIGS. 4A-C and 5A-B illustrate broader innovations of the systems and methods of this disclosure, which may be implemented in a plurality of use cases as appreciated by one skilled in the art. Some exemplary implementations of functional blocks illustrated in FIG. 5A are illustrated below in FIG. 6 which utilize contemporary technology within the art as components of a broader innovation and are not intended to be limiting to the illustrated embodiments. Additionally, with reference to FIG. 7-11, some exemplary uses for the innovative systems and methods disclosed herein are illustrated without limitation.

FIG. 6 illustrates a table 600 comprising a lookup table embodiment of a selector 502 of a system 500 illustrated in FIG. 5A above, according to an exemplary embodiment. The table 600 may comprise N columns corresponding to N neural networks 300 of a system of neural networks 504 of the system 500. N being an integer number. In some embodiments, additional features (i.e., columns) may be present in the table 600 corresponding to sub-features (e.g., clothes on a human, wherein clothes are a sub-feature of the human) and/or neural networks 300 configured to identify multiple features. Each neural network 300 of the system of neural networks 504 may be specially trained to identify a respective feature within feature data 408. In some embodiments, a single neural network 300 may be trained to identify more than one feature 410, however it is not practical or possible to train a single neural network 300 to identify every feature 410 within every environment of every robot network 210 coupled to a server 202, as appreciated by one skilled in the art. The table 600 may comprise a number of rows corresponding to a number of environments within which robot networks 210 coupled to the server 202 operate. For example, three robot networks 210 illustrated may operate in a supermarket, land surveying (i.e., as drones), or within a theme park. Each respective environment may comprise a respective set of features, wherein the features of each environment may be different from each other. For example, the robots 102 operating within the supermarket may observe humans, soda, pet food, and produce. Whereas robots 102 performing land surveying may only similarly observe humans, but may also observe different features such as trees, bushes, etc. not observed within supermarkets. As another example, land surveying robots 102 and robots 102 operating within a theme park may both observe trees and humans.

The checkmarks 602 for each respective feature may correspond to a selector 502 outputting feature data 408 to one or more neural networks 300 configured to identify the respective feature within feature data 408. For example, feature data 408 arriving from a robot 102 operating within the theme park may be outputted to neural network 300-1, neural network 300-3, neural network 300-4, and so forth in accordance with checkmarks 602 of the table 600. Advantageously, use of a lookup table 600 may configure a selector 502 to quickly determine which neural networks 300 may process feature data 408. Other methods for determining which neural network 300 of a system of neural networks 504 is trained to process feature data 408 are considered and discussed herein, wherein use of a lookup table 600 is illustrative an non-limiting.

According to at least one non-limiting exemplary embodiment, a system of neural networks 504 coupled to a server 202 may be illustrative of, at least in part, a plurality of specially trained neural networks 300 trained by external analytics or artificial inelegance companies. Each company may request from a server 202 a type of feature data 408 of which their respective one or more neural networks 300 are configured to process. For example, a company may train a neural network 300 to identify soda brands within RGB images, wherein the company may input checkmarks 602 into a table 600 at a column corresponding to a 'soda' feature and in a row corresponding to environments where soda may be present (e.g., supermarkets). That is, selector 502 may output feature data 408 to one or more neural networks 300 based on external input from the system of neural networks 504 and/or external companies who develop neural networks 300 of the system of neural networks 504.

It is appreciated that a table 600 may be illustrative of a self-referential data table, wherein additional rows and/or columns may be added by one or more processors of a server 202, or coupled processors thereto, executing computer readable instructions from a memory, as additional data is gathered by the respective robots. Additionally, additional columns may be added as additional neural networks 300 are added to a system of neural networks 504 as each additional neural network 300 is configured to identify an additional feature. Additional rows may be added as robot networks 210 are initialized in new environments. The rows and/or columns may also be added and/or removed by a host 204 of the server 202.

It is appreciated that a table 600 is illustrative of a non-limiting exemplary embodiment of a selector 502, wherein a plurality of methods may be utilized to determine one or more neural networks 300 of a system of neural networks 504 to receive a given input of feature data 408 as discussed herein and apparent to one skilled in the art. That is, a table 600 is intended to be illustrative of a selection (i.e., filtering) process to reduce computational load imposed on the system of neural networks 504 by reducing a number of neural networks 300 processing feature data 408 to neural networks 300 trained to identify features within the feature data 408, wherein implementation of selector 502 as a lookup table is not intended to be limiting.

According to at least one non-limiting exemplary embodiment, checkmarks 602 may be inputted, at least in part, by a host 204 of a server 202, wherein the host 204 may comprise one or more humans and/or computerized entities. For example, each neural network 300 may be trained by an analytics company to identify one or more specific features within feature data 408. The host 204 may provide feature data 408 to, for example, analytics companies who pay for the feature data 408, who are able to process the feature data 408, who may yield insightful outputs based on the feature data 408, and/or for any other reason. In some instances, the host 204 may utilize a table 600, or substantially similar lookup table, to record which analytics companies may receive the feature data 408.

FIG. 7 illustrates an exemplary use for the systems and methods disclosed herein to perform shelf analytics within a store, according to an exemplary embodiment. The store may comprise at least one robot 102 coupled to a server 202, wherein the at least one robot 102 may navigate within the store and capture RGB images and/or point cloud scans within the store using sensor units 114. The RGB images and/or point cloud scans may be utilized as feature data 408 to determine at least one insight 508 which, in this exemplary embodiment, comprises identification of items on shelves 714 within the store. As the at least one robot 102 navigates throughout the store (e.g., performing tasks such as cleaning), the at least one robot 102 may provide feature data 408 to the server 202 such that the server 202 may identify and localize missing items on shelves 714. The data on missing items and/or additional data on present items may be utilized by a consumer application running on a cell phone 712, or other IoT device, to identify a plurality of features of items on the shelves.

It is appreciated that a system of neural networks 504, comprising a plurality of specialized neural networks 300 configured to perform a specialized task, comprises, at least in part, neural networks 300 configured to identify the items on shelves. The neural networks 300 may each be configured to identify individual items of the shelf 714 or a single neural network 300 may be configured to identify all items of a certain planogram corresponding to the shelf 714. For example, a display within a store displaying cereal may be based on a planogram for the cereal, wherein any feature data 408 collected of this display may be communicated to a neural network 300 configured to identify cereal brands (e.g., the neural network 300 being trained using planogram data and images of cereal displays).

For example, a robot 102 may capture an image of the shelf 714 during navigation nearby the shelf 714, wherein the server 202 may generate an insight 508, using system 500 and method 512 depicted in FIG. 5A-B above. The insight 508 may comprise at least an identification of missing items 706 on the shelf 714, which may be mapped on a computer readable map of the store. A user of the phone 712 may scan. e.g., using a camera of the phone 712, the shelf 714, wherein the application may upload an image to the server 202 via wireless connection 716. The phone may then be localized within the store using conventional methods such as, for example, recognizing features 704 and 708 of the uploaded image and, based on the recognized features, localize the image and therefore localize the phone 712 nearby the shelf 714. The server 202 may utilize the insights 508 generated, comprising identified missing items 706, to determine a signal 718 to the phone 712. The signal 718 may comprise an online location (e.g., website) where the user may purchase the missing item 706, wherein the website may be stored on external data sources 206. The missing item 706 may be identified (e.g., with an SKU number or other product ID) by one or more neural networks 300 based on a planogram of the shelf 714, stored in external data sources 206 (e.g., on a computer-readable map of the store), such that the correct website is provided to the user. The signal 718 may further comprise sales, promotions, coupons, consumer reviews, or other notifications 710 related to other identified items 704 and 708 on the shelf 714 as the items 704 and 708, identified using the system 500 of FIG. 5A above based on feature data 408 collected by the robots 102 within the store. The feature data 408 being collected and analyzed prior to the user scanning the shelf 714 with the phone 712, wherein the external data sources 206 may further comprise data related to the notifications 710 of the items 704 and 708 (e.g., sales data, review data, etc.).

FIG. 8 illustrates another exemplary embodiment of the systems and methods of this disclosure for localizing an item within a store, according to an exemplary embodiment. A robot network 210, comprising at least one robot 102, may operate within the store. The at least one robot 102 may measure feature data 408 from one or more sensor units 114 during operation within the store (e.g., as a cleaning robot 102 cleans). The feature data 408 may be processed by a system 500 illustrated in FIG. 5A above such that one or more insights 508 may be generated. The insights 508, in this exemplary embodiment, may comprise localized items within the store based on identifying the items in images/scans of the feature data 408 and localizing the items based on a position of the robot 102 during acquisition of the feature data 408. A user may run an application on a cell phone 712. The application may provide a search bar 802 configured to receive input by the user corresponding to a desired item within the store the user would like to find. In this embodiment, the user is searching for an apple. The search request (e.g., "apple") may be communicated to a server 202, wherein insights 508 generated may comprise of a location of apples within the store such that directions may be provided to the user via the application. In some embodiments, a loading icon 804 may be displayed as the server 202 parses insights 508 to localize the items (e.g., the apples) within the store, however, due to the items being mapped within the store based on insights 508 generated prior to the user inputting the search request, the time spent localizing the items is substantially reduced.

In some instances, the localization of the item (e.g., the apples) may not exist in insights 508 or the items (e.g., apples) may be out of stock. In these instances, the server 202 may send signals 806 to a robot network 210 within the store to configure the robots 102 to: (i) navigate to a produce section to find apples, the produce section being localized based on. e.g., identification of other produce, planograms, computer-readable maps, etc., and communicate the location of the apples back to the cloud server (e.g., via signals 806): (ii) verify apples are in stock based on a known location of where apples should be within the store (e.g., based on planograms or prior insights 508) by navigating one or more of the robots 102 to the known location and collecting feature data 408 thereof: or (iii) restock apples if additional apples are available (e.g., from a storage room).

Figure 10:
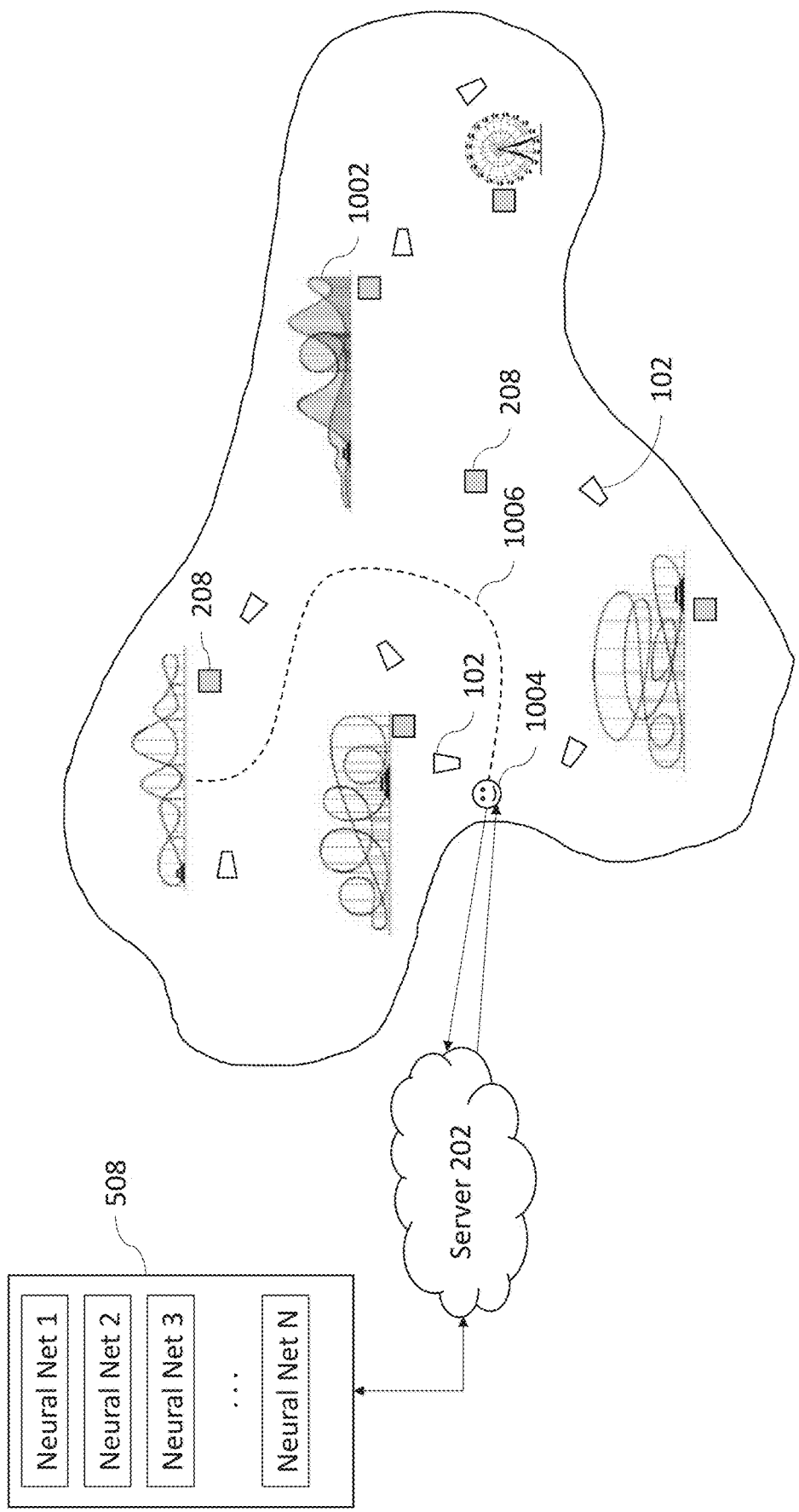
FIG. 10 illustrates an exemplary implementation of the systems and methods of this disclosure to optimize operation of a theme park, according to an exemplary embodiment.

Upon the server 202 localizing the items (i.e., the apples) within the store, the server 202 may communicate to the cell phone 712 a notification 810 comprising a location of the item within the store (e.g., "Apple is in aisle 4"). In some embodiments, an arrow 808 or path on a map (not illustrated) may be provided to the application such that the user may easily localize the item. If the items are out of stock, as determined based on feature data 408 collected by the robots 102 (e.g. within a produce section), the server 202 may access external data sources 206 to determine, for example, an online website for the items. It is appreciated by one skilled in the art that apples are an exemplary item, wherein any item may be searched by a user: identified and localized, using the systems and methods disclosed in FIG. 4-5 above: and a direction or route to the item provided to the user. Items searched may not be limited to supermarket items either, such as, as another example, a user searching for an attraction 1002 within a theme park 1000 as illustrated in FIG. 10 below, wherein localizing an item within a supermarket is not intended to be limiting.

According to at least one non-limiting exemplary embodiment, a search bar 802 may be configured to receive multiple items, wherein a server 202 may localize each item within the store based on insights 508 generated using feature data 408 collected by robots 102 and plan an optimal (i.e., shortest) route for a user to follow to obtain the items. In some embodiments, the application may configure a robot 102 within the store to execute the optimal route and collect all the items prior to the user of the application arriving at the store (e.g., a robotic shopping cart).

According to at least one non-limiting exemplary embodiment, the server 202 may localize a requested item within an environment and provide the cell phone 712 with a three-dimensional map of the environment. The three-dimensional map may be produced using data from sensor units 114 of one or more robots 102 based on images and/or point clouds collected. The user may be directed to their requested item by the cell phone 712 providing directions on the three-dimensional map.

FIG. 9 illustrates another exemplary embodiment of the systems and methods of this disclosure for use in ensuring planogram compliance and/or price compliance, according to an exemplary embodiment. A robot 102 may collect scans 910 of a shelf 918 (e.g., LiDAR point cloud scans, RGB images, etc.), wherein a server 202 may receive the scans of the shelf 910 (i.e., feature data 408) and identify all items 902, 904, and 908 on the shelf using the systems and methods illustrated in FIG. 4-5 above (i.e., generate insights 508 comprising the localized and identified items). The server 202 may compare the identified items on the shelf 918 to a planogram of the shelf 918 to determine if the items on the shelf 918 comply with the planogram, the planogram being stored in a memory of the server 202 or external data source 206. Items placed on a shelf 918 which do not comply with the planogram may yield a sub-optimal turnover rate such that it is desirable to ensure all items comply with the planogram. For example, one of the items 908 at location 906 may be identified by the server 202 to be misplaced (e.g., a planogram for the shelf 918 may denote object 904 should be in the location 906 instead of the object 908). Accordingly, the server 202 may emit a signal 920 to a local device 922 to alert, for example, an associate of the store who owns the local device 922 that the item 908 is misplaced. Alternatively, the signal 920 may be received by the robot 102 to configure the robot 102 to move the item 908 on the shelf 914.

In a same or separate non-limiting exemplary embodiment, the sensor 912 may comprise a resolution small enough to resolve a barcode 914 of a price tag 916 (a current limitation of contemporary methods for identifying items on shelves). Barcode 914 may similarly represent a price (e.g., a numeric value) printed on the price tag 916. Accordingly, the server 202 may receive scans of the item 908 and price tag 916 at location 906 and verify a price/barcode 914 of a price tag 916 corresponds to the item 908 at location 906 using price data within external databases 206. If the price/barcode 914 does not correspond to the item 908, a signal 920 may be sent to a local device 922 to, for example, alert a store associate or a robot 102. If the price/barcode 914 does correspond to the item 908 no signal 920 may be emitted.

According to at least one non-limiting exemplary embodiment, multiple local devices 922 may receive a signal 920. For example, multiple store associates may be alerted to the misplaced item such that a nearest associate may replace/move the item 908. In some instances, upon relocating a misplaced item on a shelf, an associate or robot 102 may capture an image of the corrected items on the shelf and upload the image to a server 202 as feature data 408 such that the server 202 may generate an insight 508. The insight 508 corresponding to, for example, an update to a computer readable map of the store comprising localized items therein.

FIG. 10 illustrates a utilization of the systems and methods of this disclosure to enhance operations of and/or user experience within a theme park 1000, according to an exemplary embodiment. Theme park 1000 may comprise a plurality of attractions 1002 (e.g., roller coasters. Ferris wheels, games, etc.) located throughout. The theme park 1000 may further comprise a robot network 210 operating therein, comprising a plurality of robots 102 (e.g., cleaning robots, robotic performers/entertainers, autonomous transportation vehicles, etc.), as well as devices 208 (e.g., CCTV cameras, motion sensors, IMUs of the attractions 1002, etc.). A user 1004 may utilize an application on a phone, similar to the application on phones 712 illustrated in FIG. 7-9 above, to plan a route which minimizes, for example, wait times for attractions 1002 and route length. The application may communicate this request to the server 202. The server 202 may parse a plurality of insights 508 generated as the robots 102 operate within the theme park 1000 in response to the request. The insights 508 may comprise, without limitation, a count of a number of people in line for each attraction 1002 (e.g., using neural networks 300 trained to identify humans in images captured by CCTV cameras or robots 102), maintenance times for each attraction 1002 (e.g., using external databases 206 or observing temporal trends over time using a neural network 300), location of each attraction 1002 within the theme park 1000 (e.g., using external databases 206 comprising mapping data of the theme park 1000), and so forth.

Using the insights 508, the server 202 may generate a path 1006 for the user 1004 to follow which minimizes wait times by finding an attraction 1002 with a shortest line (e.g., based on CCTV data from a device 208 or scans from a robot 102), minimizes walking distance for the user 1004, avoids maintenance windows for the attractions 1002, and avoids the most crowded areas of the theme park 1000. These and a plurality of other insights 508 may further be utilized to generate the path 1006 without limitation.

In some embodiments, the plurality of robots 102 and devices 208 may collect a plurality of images, or other data formats, such that a server 202 may identify humans within the images and thereby localize the humans within the theme park 1000. The server 202 may utilize the localization data of the humans to observe temporal trends (e.g., using a neural network 300) of where the humans are within the theme park 1000 during the day. Using this insight 508, the route 1006 for a user 1004 may be generated such that the user 1004 avoids crowded areas (if desired by the user 1004) based on a time of day when the user inputs the request to find the route 1006.

In another non-limiting exemplary embodiment, the user 1004 comprises an employee of the theme park 1000. In this embodiment, the server 202 may generate insights 508 related to tasks for the employee 1004 to perform. For example, a robot 102 may identify a collect feature data 408 near one of the attractions using sensor units 114, the feature being a spilled drink on a floor. In some instances, the server 202 may identify the spill within the feature data 408, using one or more neural networks 300 as illustrated above in FIG. 5A, and configure the robot 102 or different robot 102 to clean the spill or instruct the employee where the spill is such that the employee may clean the spill. That is, a server 202 using the systems and methods disclosed herein may act as a virtual manager for associates of the theme park 1000 by delegating tasks optimally based on insights 508 generated using a substantial amount of feature data 408 collected by the robot network 210 and processed by a system 500 of FIG. 5A.

In another non-limiting exemplary embodiment, some of the robots 102 within a theme park 1000 may operate within gift stores. The robots 102 within the stores may perform the shelf analytics described above in FIG. 7-9, to further enhance efficiency of the theme park 1000 by improving turnover rate of items within the stores and/or assisting consumers.

Other advantages of using a network of robots 210 to enhance efficiency or user/worker experience of/within a theme park 1000, or other large area, by scanning features and identifying the features, using the systems and methods disclosed in FIG. 4-5 above, are readily discernable by one skilled in the art.

In another non-limiting exemplary embodiment, theme park 1000 may be illustrative of an airport, wherein attractions 1002 may be illustrative of terminals and/or runways for airplanes. Robots 102 and/or devices 208 operating within the airport may collect feature data 408 such as, without limitation, locations of people within the airport and locations of planes which are soon to depart, land, or are departing. A server 202 may also access a database 206 comprising flight schedules. The feature data 408 may be utilized to determine optimal flow of people to respective gates for upcoming departing flights. For example, feature data 408 collected by robots 102 operating within the airport may be utilized to generate insights 508 using system 500 illustrated in FIG. 5A above. The insights 508 may include regions of the airport comprising a substantial amount of people and other regions comprising fewer people. The insights 508 may further comprise a predicted flow of people within the airport based on observing a temporal trend of the flow of people over time (e.g., over multiple days or weeks). Accordingly, a server 202 may utilize the insights 508 to determine optimal gates for incoming planes to arrive such that: (i) congestion of people within the airport is minimized. (ii) travel time for people through the airport is minimized. (iii) flights arrive and leave efficiently, and (iv) direct staff of the airport/airlines where to go within the airport to improve worker efficiency.

Figure 11:
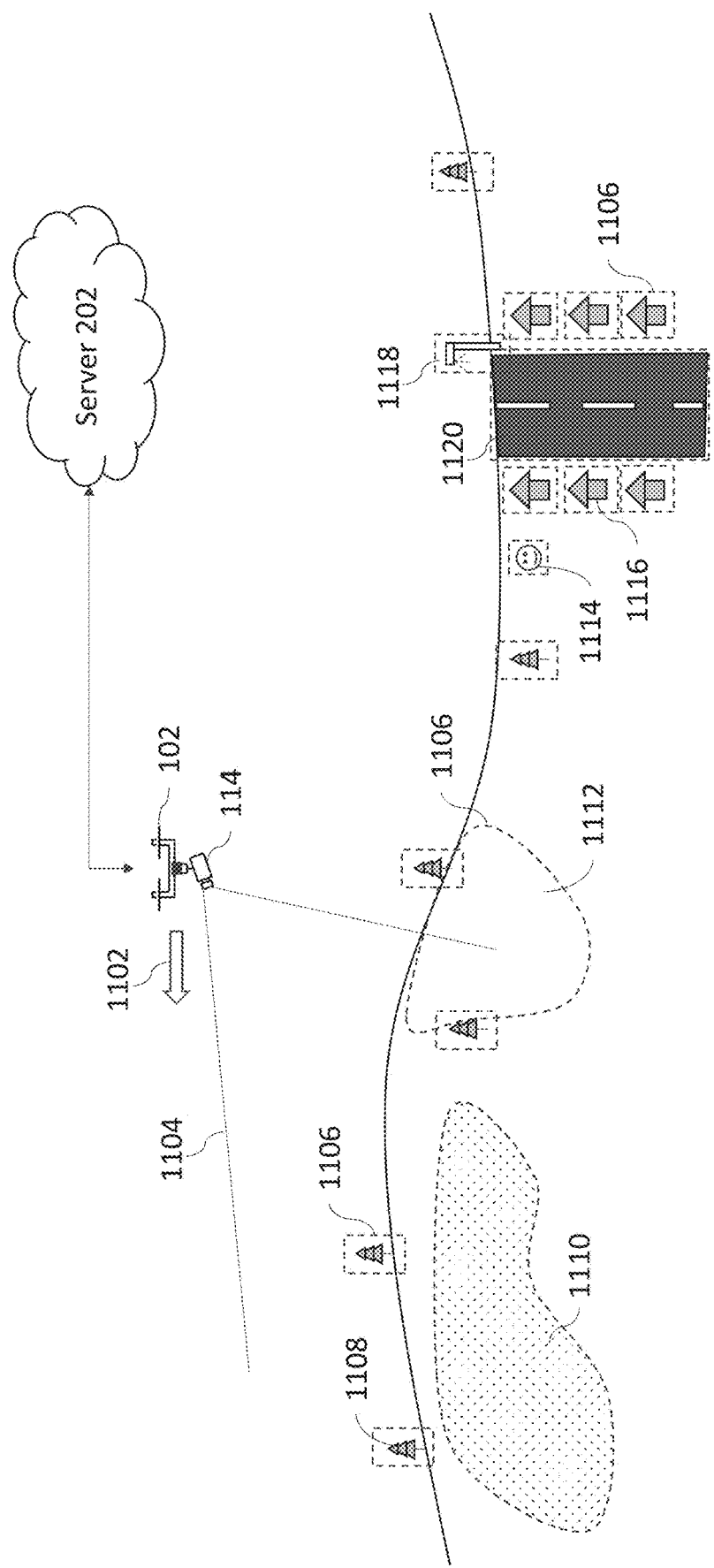
FIG. 11 illustrates an exemplary implementation of the systems and methods of this disclosure to identify features using a land surveying robot, according to an exemplary embodiment.

FIG. 11 illustrates another exemplary implementation of the systems and methods of the present disclosure to identify features by a land surveying robot 102, according to an exemplary embodiment. As the robot 102 navigates along a predetermined flight plan or route 1102, the robot 102 may utilize a sensor unit 114 to collect feature data 408 from within the field of view 1104 of the sensor unit 114. The robot 102 may also localize itself during acquisition of the feature data 408 at all times. The feature data 408 may comprise LiDAR point cloud scans. RGB images, and/or any associated metadata thereto (e.g., timestamps, location of robot 102 during acquisition of the feature data 408, etc.). The robot 102 may communicate the feature data 408 to a server 202 comprising a system 500 illustrated in FIG. 5A above. The server 202 may generate insights 508 using the feature data 408 comprising identified and localized features 1108, 1110, 1112, 1114, 1116, 1118, and 1120. Feature 1108 may comprise trees, wherein a specialized neural network 300 of a system of neural networks 504 may be trained to receive the feature data 408 and identify trees therein.

Similarly, another specialized neural network 300 may identify a feature 1110 corresponding to a lake or field of crops, for example. Another specialized neural network 300 may identify features 1112 corresponding to topological features (e.g., fault lines, cliffs, etc.), and so forth. Features 1114 may comprise human features 1116 may comprise houses. A feature 1118 may comprise light posts, or features 1120 may comprise roads, wherein each respective feature is identified using a respective specialized neural network 300. In some embodiments, a single neural network 300 may identify multiple features such as identifying both trees 1108 and lakes 1110, as appreciated by one skilled in the art, however using a single neural network 300 to identify all features 1108, 1110, 1112, 1114, 1118, and 1120 may be impractical due to reasons discussed above. Upon identifying the features 1108, 1110, 1112, 1114, 1118, and 1120, a bounding box 1106 may be assigned to each respective feature corresponding to a spatial position (i.e., area occupied) by the respective feature. The spatial positions of the bounding boxes 1106 may be based on a location of the robot 102 during acquisition of feature data 408 which identifies the respective features, wherein a plurality of contemporary methods for localizing the bounding boxes 1106 may additionally be used without limitation and readily discernable to one skilled in the art based on a configuration of the robot 102 (e.g., based on how many or what type of sensor units 114 the robot 102 comprises). These bounding boxes 1106 and locations thereof may be stored on a computer readable map of the land surveyed by the robot 102.

Advantageously, the land surveying robot 102 may utilize the server 202 and the systems and methods disclosed herein to localize a plurality of different features 1108, 1110, 1112, 1114, 1118, 1120, and more/other features not illustrated. Localization of the features requiring no additional processing resources of the robot 102 as the computations are performed on a distributed system of neural networks 504 separate from the robot 102. Localization of the features may yield a plurality of additional insights 508 such as, for example, monitoring tree 1108 growth in a forest, observing an impact of roads 1120 and houses 1116 on a surrounding environment, monitoring faults 1112, ensuring streetlamps 1118 are functioning, and so forth. These insights 508 may be further utilized by the robot 102 to plan its trajectory 1102 or may be utilized by other robots 102 and/or devices 208 in many ways as appreciated by one skilled in the art (e.g., configures a robot to repair a detected malfunctioning streetlamp 1118, yield insightful data to a farmer using a land surveying robot 102 to monitor crop growth, etc.).

Figure 12:
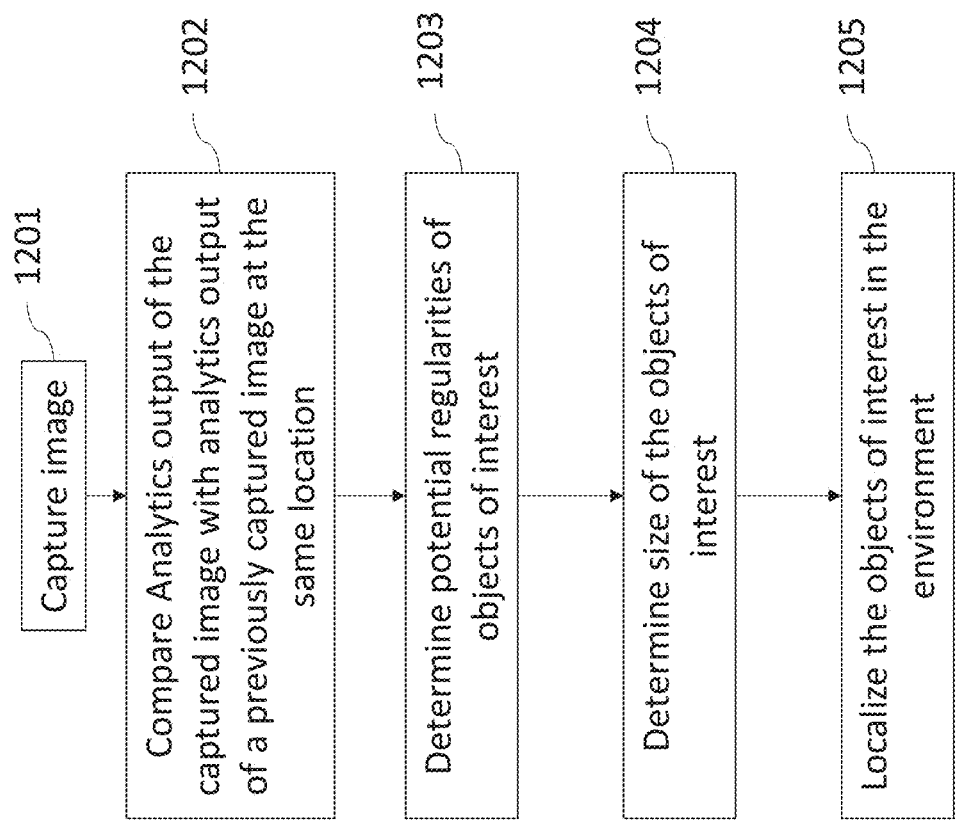
FIG. 12 illustrates an exemplary embodiment of the systems and methods of this disclosure to identify features using a land-surveying robot.

Further, inventive concepts disclosed herein are directed to classifying images when the number of categories is really high or greater in volume, and when the images are being captured on a moving robot in dynamic real-world environment (e.g., at 60 frames per second) that translates or navigates in an environment between a first location and a second location. Thereby, providing visibility of content of interest. In order to achieve these inventive concepts. FIG. 12 will be discussed in further detail. For each image recorded or captured, the controller 118 of the robot 102 has stored in its memory 120 the orientation of the camera or imaging sensor 114, a camera projection matrix corresponding to the sensor 114, and where in the space or environment the image was captured. In other words, the controller 118 is able to associate the image captured to a particular, specific location as the robot 102 travels along a route. Thus, at step 1201 the robot 102, via executing computer readable instructions by the controller 118, is able to capture image of the environment, or a particular point of interest in the environment. The controller 118 may subsequently communicate the captured image to a server 202 such that the server 202 may receive analytics or insights 508 relating to any detected features within the image. These analytics may be communicated to the robot 102.

Next, at step 1202 the robot 102, via executing computer readable instructions by the controller 118, is able to compare analytics of the captured image with historic data. The comparison is done between the captured image at that instant in time with an image previously captured at a prior instance in time. In particular, analytics output of the captured image are compared with the analytics output of a previously generated image or multiple images. The analytics output may comprise various factors relating to the image such as characteristics of the object of interest in the image (i.e., type of the product being depicted in the object of interest). The prior image is captured at the prior instance in time, for example the day before, at the same location in the environment with the same came or image sensor 114 orientation to determine difference as to what is present and not present. For example, based on the comparison, it can be determined that what was on display in a grocery environment at the same location or shelf space at a prior instance in time (e.g. a day before) the robot visited or traveled at that place, is not present there anymore. Alternatively, determine that for point of interest detection, there was an ATM machine, and not a check-in kiosk, at the same location last time the robot was there. Further, for example, the robot 102 knows the area scanned previously, at an earlier time, included a specific product such as cheese-puffs. In the event, the robot 102 is unable to determine or decide whether the object of interest scanned at a present time consists of cheese-puff or something else, then it will bias the algorithm to favor in deciding that the object of interest constitutes or corresponds to the cheese-puffs. That is. The robot 102, if unable to determine what an object of interest is, may bias its determination based on objects of interest previously detected at the same or similar location.

Next, at step 1203 potential regularities of how detectable objects, or categories are displayed in space and their relation to each other is used to narrow down the search-space in order to determine the object of interest in the captured image. That is, robot 102 is able to narrow down the possible categories that can be present in the image with higher probability.

For example. FIG. 13 illustrates a histogram 1300 comprising a probability distribution that for a given location a respective feature, or object of interest, is present, according to an exemplary embodiment. Histogram 1300 may be based on features which have been identified in the past at the given location. That is, histogram 1300 may include a different distribution of feature probability for different locations. Based on historical trends, features h, i, and j have frequently been detected within images captured at the given location, as shown by various spikes which exceed a threshold 1302. For example, feature h may include pretzels, feature i may include cheese-puffs, and feature/may include a specific cereal. If a server 202 receives labeled data 508 which communicates that cheese-puffs and oatmeal are found at the location, with equal uncertainty, the server 202 will determine that the feature corresponds to cheese-puffs based on historical data shown by histogram 1300.

In some embodiments, the illustrated spikes in the historic feature data which exceed the threshold 1302 may be provided to selector 502 such that the selector 502 provides images captured at the location to neural networks 300 configured to identify the common features h, i, and j. In some embodiments, the threshold used by the selector 502 in determining one or more neural networks 300 to process incoming images captured at a respective location may be lower than the threshold 1302 used to determine which features are present based on historic data.

In some embodiments, planogram data may be utilized. Planograms, such as the one illustrated in FIG. 14, may detail where within an environment certain items are to be displayed. For example, a planogram may detail that aisle 1 is produce, aisle 2 is canned goods, and so forth. The planogram may further detail which specific items are displayed on a respective shelf, display, aisle, etc., as shown in FIG. 14. If robot 102 captures an image which depicts the display corresponding to planogram 1402 (determined based on the position of the robot 102), server 202 may determine that the possible features detectable within images captured at the location may be limited to the subset of items shown on planogram 1402. It should be noted that misplaced items may appear in the display of planogram 1402 in practice, wherein features not included in the subset of features shown by planogram 1402 may also be detected in real-world environments.

Next, at step 1204 the robot 102 knows its location in space and potential distance from the object it is detecting. In some instances, data from other sensor units 114, such as LiDAR or depth cameras, may be utilized to localize the detected object in three-dimensional space. In some instances, a camera projection matrix may be further utilized by the controller 118 to calculate the approximate location of the detected object of interest in three-dimensional space. The robot is also configured with sensors and an algorithm to estimate the size of the object it is detecting (e.g. location of the robot, distance to the object). The robot can also have an assumption on the expected size of the detectable objects based on data from external data sources 206 (e.g., if a robot detects a universal product code ("UPC") #2020200 at a location, external data sources 206, such as product information pertaining to the same UPC, may provide an approximate size of the detected object of interest).

Lastly, step 1205 includes the robot 102 localizing the object of interest in three-dimensional space based on the various parameters discussed above (i.e., robot 102 position, camera projection matrix, data from sensor units 114, object size, etc.). The object of interest may be localized onto a computer readable map. Such map may be a two-dimensional map or a three-dimensional map accessible by robots 102 and/or devices 208 coupled to the server 20.

In turn by employing this algorithm illustrated in FIG. 12, classification of the object(s) of interest can be simplified, and thereby resulting in a robot 102 working more efficiently as it requires less processing of data and less usage of memory space. Further, by executing the algorithms disclosed herein, the number of errors (i.e., incorrectly recognized objects or objects not detected) will be minimized, and the identification of features will trend to the ground truth.

By executing the computer readable instructions stored in memory 120, controller is able to determine where the image was captured and also determine (from the planogram) what should be on display in a particular aisle or on a particular shelf. If the controller 118 is uncertain about a particular SKU of an object of interest, it can be configured to bias the classification's output to the expected SKU (from the planogram). In a retail space environment, typically in each aisle there is only certain category of products on display. For example, cleaning product, pet food, etc. Example: The controller 118 of the robot 102 is able to determine that the data was collected in the pet food section and it is uncertain about classifying a particular SKU and deciding between a particular dog food versus other SKU (e.g. wood chips). In such situation decision by the controller 118 can be configured to bias or prefer the dog food SKU.

In case of Point of Interest ("POI") detection, controller 118 is executing computer readable instructions on multiple robots in multiple environments, e.g. retail, airports, etc. to capture images which are communicated to a server 202, wherein the server 202 may utilize one or more neural networks 300 to identify features within the image as shown above. As such, there could be hundreds or thousands or total number of POIs detected by the fleet of robots, but only a subset (e.g. tens) at any given type of location. For example, escalator is a POI, but if the robot 102 determines that it is running in a single story building which does not have any escalator, then algorithms, computer readable instructions, and full analytics software can be configured to use this information and not categorize anything as an escalator in that environment even if the controller 118 may be confused and falsely recognize something in the environment as an escalator. Output from a prior day narrows the search-space and/or biases for the classification of a point of interest object. For example: The analytics output is uncertain about deciding between an ATM machine and other objects (e.g. check-in kiosk at the airport) but based on prior images the controller 118 determines that yesterday at that location there was an ATM machine. In this case, the algorithm can be configured to be biased for the object that it saw there yesterday (or time of previous data collection/analytics).

The classification is uncertain about the detection of an object (e.g. a packaged SKU in a retail environment) and is uncertain deciding between two likely output class (e.g. two SKUs) that may look similar, but they differ in size. In such scenario, the algorithm can be configured to take the measured and expected size of the detectable objects into account and bias its output based on such configuration.

In certain store environments (Sam's Club, Costco, Walmart, etc.) where items are displayed in bulk and in individual slots/pallets, algorithm or computer-readable instructions can dynamically detect and correct false-positives according to all the neighboring detection results. For example, if there is one (1) out of 20 products falsely detected from the same pallet, the algorithm can choose the more likely candidate from its neighbors from the same location.

In scenarios of SKU detection, changes in packaging detected at a single store can be generalized to additional stores. In case of point of interest, objects learned in one location can be recognized in new locations without explicit training. Product packaging information may also be communicated to server 202 via external data sources 206 such as product packaging displayed on merchant websites (e.g., Amazon). Similarly, localization information is often common across environments (e.g. milk next to eggs or the men's bathroom next to the women's) and can be leveraged for adding context to SKU or POI recognition. With localized data, it is possible to validate the results of sensor recognition by means other than human expert labeling of raw telemetry. For example, a store employee could check the exact SKU of a milk carton on the top shelf in aisle 13, section 3. Typical machine learning tasks involve manual labeling of raw data without leveraging additional contextual information. In addition to using the above regularities, the robot can be configured to change its behavior, e.g. the route, depending on recognition performance and collect more (training) data of items that were uncertainly recognized.

Accordingly, the inventive concepts disclose using additional information that comes with the image from the robot and with this it can improve the recognition capabilities/performance of an otherwise very difficult image classification problem. By using this extra information, both the false positive and false negative rates can be drastically improved. As one skilled in the art will appreciate, and discussed above, location information is determined based on sensors such as LiDARs, RGB cameras, 3D sensors, wheel encoders, IMUs, accelerometers, or beacons in the environment, RF technology, RFID, ultra wideband localization, etc.; and/or combination thereof.

Figure 15:
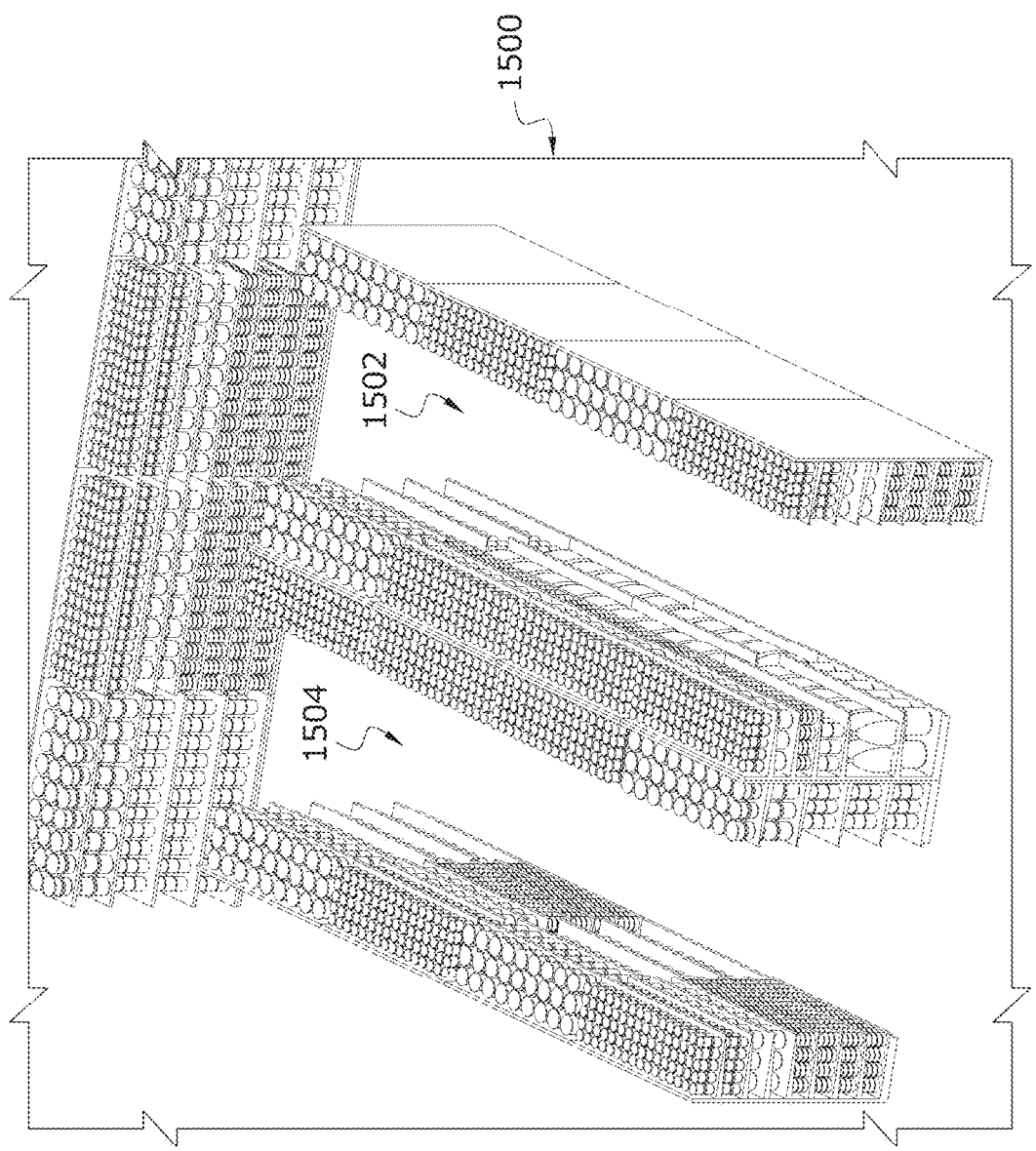
FIG. 15 illustrates a three-dimensional computer readable map of an environment based on data collected by a robot, according to an exemplary embodiment.

According to at least one non-limiting exemplary embodiment of the present disclosure, detected features and robot 102 sensor unit 114 data may be utilized to generate 3-dimensional maps of an environment. For example, FIG. 15 depicts a 3-dimensional map of a store, such as a pet store, wherein a robot 102 may have navigated through the two aisles 1502, 1504. In navigating through the two aisles 1502, 1504, the robot 102 may collect (i) image data and (ii) data corresponding to the size and shapes of nearby objects, such as the shelves of the aisles 1502, 1504. Features within the image data may be identified as shown and described above. Data corresponding to the size and shape of nearby objects may be collected from exteroceptive sensor units 114, such as LiDAR sensors, depth cameras, and the like. The image data may provide the controller 118 or processor 130 of a server 202 with color information for the surfaces of the detected objects. Specifically, the images depict colors (i.e., features/items) on the shelves and the data from the LiDAR sensors may correspond to the size/shape of the shelves. Accordingly, the images may be superimposed over the detected surfaces such that the 3-dimensional map 1500 may be generated.

Figure 16:
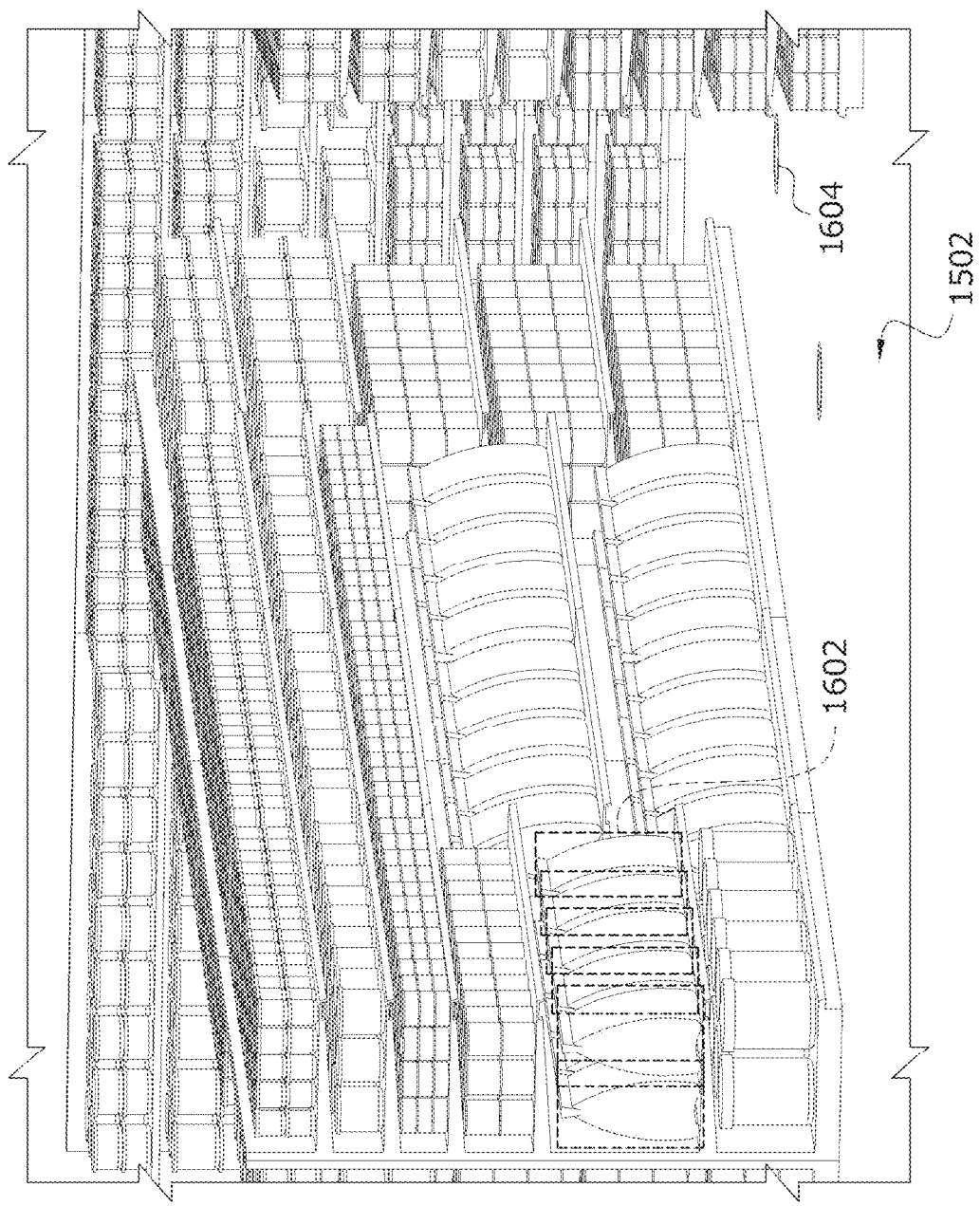
FIG. 16 illustrates a perspective view of a three-dimensional computer readable map including identified features therein, according to an exemplary embodiment.

FIG. 16 illustrates a close-up view 1600 of the map 1500 shown in FIG. 15 above, according to an exemplary embodiment. View 1600 may correspond to a perspective view of aisle 1502 based on images captured by sensors of a robot 102. View 1600 may be displayed, for example with reference to FIG. 8, on a cell phone 712 (or another device, e.g., a personal computer) upon a user providing input 802 to a prompt. In the illustrated embodiment, the user may request "dry cat food" instead of "apple" and follow directions on the 3-dimensional map 1500. Returning to FIG. 16, the user may arrive at an aisle containing dry cat food, as shown by dry cat food being detected within bounding boxes 1602. If the user desires, for example, a different dry cat food than the ones in box 1602, the user may tap, click, or select a different feature within the image (e.g., the objects on the shelf below). In response to the user selecting to view a feature, server 202 may communicate the identification of the feature to the device 208, the identification being based on the system 500 shown in FIG. 5A above (i., an output from one or more neural networks 300). In some embodiments, the depicted features shown at any waypoint 1604 may be communicated to the device ahead of time to reduce latency between the user selecting the feature and the device 208 displaying its identification. In some instances, the user may continue navigating the store by selecting waypoints 1604 which move the perspective view to a different location. Waypoints 1604 may correspond to discretized locations within the map 1500 and/or locations where images captured by robots 102 were scanned for features. Human users may navigate the map 1500 by selecting waypoints 1604 and moving through the map 1500. Although not explicitly illustrated with bounding boxes 1602, other features (i.e., products) within aisle 1502 may be identified, wherein bounding boxes 1602 for the other features are omitted for clarity.

Figure 17:
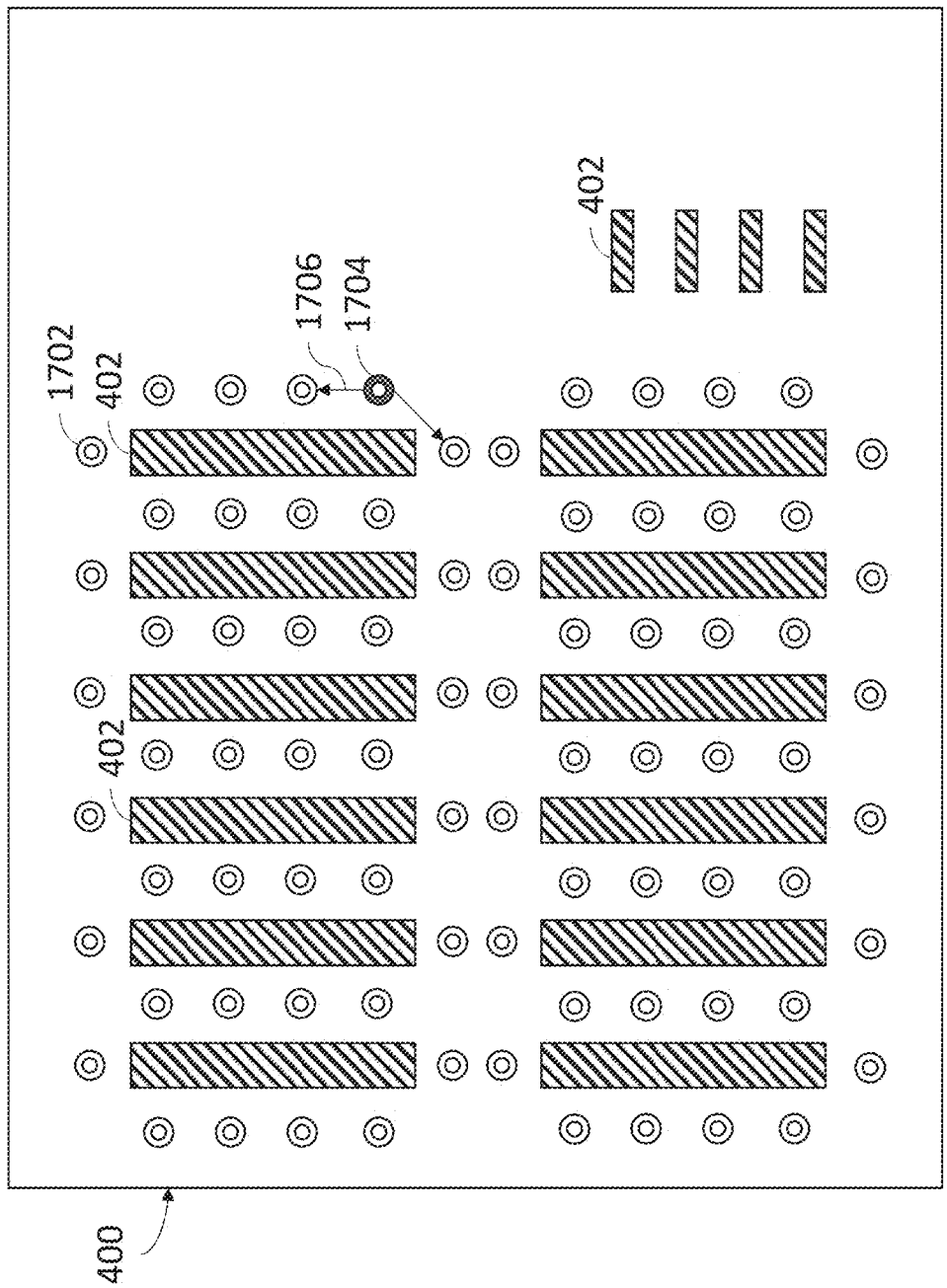
FIG. 17 illustrates a top-down view of a computer readable map navigable by a device of a user, according to an exemplary embodiment.

FIG. 17 illustrates a computer readable map of environment 400, the map includes a plurality of points 1702, according to an exemplary embodiment. Each of points 1702 may be localized to a certain (x, y) location within the map based on the (x, y) location of the robot 102 during acquisition of the image. As discussed above, controller 118 always and continuously localizes the robot 102 within the environment 400 during navigation, wherein images captured at points 1702 may be associated with the respective location of the robot 102 during acquisition (e.g., via metadata).

The images captured at points 1702 and their corresponding location data may be transmitted to the server 202, wherein a processing device 130 of the server 202 may utilize the image and location data to produce a three-dimensional map of the environment 400. Such three-dimensional map may be accessed by devices 208 to enable a user of the devices 208 to virtually navigate within the environment 400. Navigation within a three-dimensional map may comprise the device 208 displaying the image(s) captured for any location 1702 and, in response to a user request to e.g., move forwards or backwards within the environment 400, the device 208 may cycle to a nearby image associated with a nearby point 1702.

To illustrate using an example, a user of a device 208 may access the three-dimensional map of the environment 400. The user may select one of the plurality of locations 1702 on the computer readable map or on a map similar to map 1500 in FIG. 15 above to view the images associated with the location 1702 captured by the robot 102. Point 1704 (grey) may represent the currently selected point 1702, wherein the device 208 may display the image(s) captured by the robot 102 at the location 1704 similar to the three-dimensional map display in FIG. 16. That is, locations 1704, when selected, may act similar to the depicted waypoints 1604 in FIG. 16, wherein the user may navigate the environment 400 by navigating to a waypoint 1604/location 1702 and viewing the image(s) captured by the robot 102 at that location. In some embodiments, the captured images may be 360° images which may enable the user of the device 208 to look around a 360° view about the location 1704. If the user desires to navigate elsewhere in the environment 400, the user may select a movement option (e.g., arrow keys, taping/clicking/selecting a nearby location 1702, etc.) which causes the device 208 to display the image associated with one of the neighboring locations 1702. The neighboring locations 1702 are shown by arrows 1706.

According to at least one non-limiting exemplary embodiment, the image(s) associated with each location 1702 may comprise a panoramic image. According to at least one non-limiting exemplary embodiment, the image(s) associated with each location 1702 may be aligned or stitched together to form a panoramic image or 360° view image.

According to at least one non-limiting exemplary embodiment, the map of environment 400 is provided to the device 208 upon the device 208 requesting the map. For example, the device 208 may be owned by a human desiring to find a product or feature within environment 400 remotely. The images may by communicated as part of the map or may be communicated when the user selects one of the plurality of locations 1702 to view the image associated with the selected location 1702.

According to at least one non-limiting exemplary embodiment, while the device 208 is displaying the image associated with a selected location 1704, server 202 may communicate the images associated with neighboring locations 1702 to enable the device 208 to buffer the images in case the user selects to view one or more of them after viewing the image at location 1704. Buffering may reduce the latency between the user selecting to move to a new location 1702 and the device 208 displaying the corresponding image.

According to at least one non-limiting exemplary embodiment, the neighboring points 1702 which may be navigated to from any given point 1704 comprises (i) the location of the robot 102 during acquisition of an image captured prior to the image at location 1704, and (ii) the location of the robot 102 during acquisition of an image captured subsequent to the image at location 1704. Stated differently, the series of locations 1702 of which the user of device 208 may view corresponds to the order in which the robot 102 captured the images (i.e., follows the route navigated by the robot 102).

According to at least one non-limiting exemplary embodiment, the three-dimensional map as discussed herein may comprise a sequence of navigable images corresponding to locations 1702 with each of locations 1702 being displayed on a two-dimensional map, similar to the map shown in FIG. 17. While at each location 1702, the user is able to, via device 208, view the surrounding environment as seen by the image sensors on the robot 102 at the location 1702, essentially providing the user with a three-dimensional view of the environment 400. By navigating to a nearby location 1702, the user is provided with an image depicting the environment 400 at the location 1702. That is, the user of device 208 by viewing the images at locations 1702 may view a three-dimensional depiction of the environment without the processing device 130 rendering or calculating any three-dimensional structure. Rendering three-dimensional structures based on image data and, in some instances, data from other sensors (e.g., LiDAR) of the robot 102 may be computationally costly and provide the user with very little additional information since the (x, y) positions of the locations 1702 are measured by the robot 102 and constrained to those locations.

According to at least one non-limiting exemplary embodiment, the origin of the map of environment 400 may correspond to the location where the robot 102 began its route. For example, robot 102 may scan, via sensor units 114, a landmark (e.g., a barcode, quick-response code, a salient feature, a color pattern, etc.) used to define the start of a route and the origin of the map.

Advantageously, by utilizing the (x, y) locations of the images captured by the robot 102, the processor 130 used to produce the three-dimensional map of environment 400 is able to constrain possible locations of the images. Currently, conventional methods of producing three-dimensional maps using images utilize image stitching and image analysis methods, which are costly in computational resources and time in addition to not being spatially accurate. By providing the locations of the images, the map of the environment is effectively constrained to the locations of the images as measured by the controller 118 of the robot 102, yielding enhanced spatial accuracy of the three-dimensional map.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like: the term "comprising" as used herein is synonymous with "including," "containing," or "characterized by," and is inclusive or open-ended and does not exclude additional, unrecited elements or method steps: the term "having" should be interpreted as "having at least:" the term "such as" should be interpreted as "such as, without limitation:" the term "includes" should be interpreted as "includes but is not limited to:" the term "example" is used to provide exemplary instances of the item in discussion, not an exhaustive or limiting list thereof, and should be interpreted as "example, but without limitation:" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A server system, comprising:
   at least one robot coupled to the server system;
   a plurality of models coupled to the server system configured to identify features within imagery with an associated confidence; and
   a centralized server comprising one or more processors configured to execute computer readable instructions that cause at least one of the one or more processors to:
   receive at least one image from a sensor on at least one robot coupled to the at least one processor, each of the at least one images associated with a corresponding location comprising a local environment in which the robot is navigating during acquisition of the image, wherein each of the at least one image comprises feature data;
   select, based at least in part on the corresponding location of each of the at least one image, at least one model from a plurality of models coupled to the at least one processor and communicate the feature data to the selected at least one model, the corresponding location of each of the at least one images being on a first computer readable map produced by the at least one robot, wherein each of the plurality of models is configured to identify the feature data;
   cause each of the at least one selected model to identify the feature data within each corresponding image to produce a labeled data output, wherein the labeled output data comprises an identification of one or more features within each image and is selected based in part on a confidence thereof;
   determine, based upon the corresponding location of each of the at least one image on the first computer readable map and an image-space position of each respective feature in each corresponding image, a location of the labeled data output within the local environment
   generate at least one insight comprising at least in part the location of the labeled data output within the local environment;
   construct a second computer readable map based on the location of the at least one insight, wherein the second computer readable map includes a plurality of user selectable locations corresponding to each respective location of the at least one image captured by the robot at the each corresponding location of the at least one images, each of the user selectable locations includes one or more of the at least one insights which correspond to the respective selectable location, the one or more of the at least one insights are displayed on the second computer readable map based on the determined location of the at least one insight; and
   provide a device with at least a portion of the second computer readable map when requested by the device.

2. The server system of claim 1, wherein,
   upon the user selecting a location of the plurality, at least one of the one or more processors of the centralized server displays the at least one image captured by the robot at the selected location.

3. The server system of claim 2, wherein,
   at least one of the one or more processors of the centralized server communicates at least one additional image corresponding to a neighboring location to the selected location causing the device to store the at least one additional image in a buffer.

4. The server system of claim 2, wherein,
   the at least one image captured at each of the locations comprises at least one of a plurality of images stitched or aligned together, a panoramic image, or a 360° view image captured by a wide field of view camera.

5. The server system of claim 2, wherein the computer readable instructions further cause at least one of the one or more processors of the centralized server to:
   identify one or more features within the image displayed at the selected based on the labeled data output from the selected at least one model.

6. The server system of claim 5, wherein the computer readable instructions further cause at least one of the one or more processors of the centralized server to:
   transmit identification of one or more features within the image to cause the device to display the identification of one or more features, the one or more features corresponding to selected ones of a plurality of features depicted at the location.

7. A non-transitory computer readable storage medium having a plurality of computer readable instructions stored thereon which, when executed by one or more processors of a centralized server, cause at least one of the one or more processors to:
   receive at least one image from a sensor on at least one robot coupled to the at least one processor, each of the at least one images associated with a corresponding location comprising a local environment in which the robot is navigating during acquisition of the image, wherein each of the at least one image comprises feature data;
   select, based at least in part on the corresponding location of each of the at least one image, at least one model from a plurality of models coupled to the at least one processor and communicate the feature data to the selected at least one model, the corresponding location of each of the at least one images being on a first computer readable map, wherein each of the plurality of models is configured to identify the feature data;
   cause each of the at least one selected model to identify the feature data within each corresponding image to produce a labeled data output, wherein the labeled output data comprises an identification of one or more features within each image and is selected based in part on confidence thereof;
   determine, based upon the corresponding location of each of the at least one image on the first computer readable map and an image-space position of each respective feature in each corresponding image, a location of the labeled data output within the local environment;
   generate at least one insight comprising at least in part the location of the labeled data output within the local environment;
   construct a second computer readable map based on the location of the at least one insight, wherein the second computer readable map includes a plurality of user selectable locations corresponding to each respective location of the at least one image captured by the robot at the each corresponding location of the at least one images, each of the user selectable locations includes one or more of the at least one insights which correspond to the respective selectable location, the one or more of the at least one insights are displayed on the second computer readable map based on the determined location of the at least one insight; and
   provide a device with at least a portion of the second computer readable map when requested by the device.

8. The non-transitory computer readable storage medium of claim 7, wherein,
upon the user selecting a location of the plurality, at least one of the one or more processors of the centralized server displays the at least one image captured by the robot at the selected location.

9. The non-transitory computer readable storage medium of claim 8, wherein,
at least one of the one or more processors of the centralized server communicates at least one additional image corresponding to a neighboring location to the selected location causing the device to store the at least one additional image in a buffer.

10. The non-transitory computer readable storage medium of claim 8, wherein, the at least one image captured at each of the locations comprises at least one of a plurality of images stitched or aligned together, a panoramic image, or a 360° view image captured by a wide field of view camera.

11. The non-transitory computer readable storage medium of claim 8, wherein the computer readable instructions further cause at least one the one or more processors of the centralized server to:
identify one or more features within the image displayed at the selected location based on the labeled data output from the selected at least one model.

12. The non-transitory computer readable storage medium of claim 11, wherein the computer readable instructions further cause at least one the one or more processors of the centralized server to:
transmit an identification of one or more features within the image to cause the device to display the identification of one or more features, the one or more features corresponding to selected ones of a plurality of features depicted at the location.

13. A method, executed by one or more processors of a centralized server, the method comprising:
receiving, by at least one of the one or more processors of the centralized server, at least one image from a sensor on at least one robot coupled to the at least one processor, each of the at least one images associated with a corresponding location comprising a local environment in which the robot is navigating during acquisition of the image, wherein each of the at least one image comprises feature data;
selecting, by at least one of the one or more processors of the centralized server and based at least in part on the corresponding location of each of the at least one image, at least one model from a plurality of models coupled to the at least one processor and communicating the feature data to the selected at least one model, the corresponding location of each of the at least one images being on a first computer readable map produced by the at least one robot, wherein each of the plurality of models is configured to identify the feature data;
causing, by at least one of the one or more processors of the centralized server, each of the at least one selected model to identify the feature data within each corresponding image to produce a labeled data output, wherein the labeled output data comprises an identification of one or more features within each image and is selected based in part on a confidence thereof;
determining, by at least one of the one or more processors of the centralized server using the first computer readable map and based upon the corresponding location of each of the at least one image and an image-space position of each respective feature in each corresponding, a location of the labeled data output within the local environment;
generating, by at least one of the one or more processors of the centralized server, at least one insight comprising at least in part the location of the labeled data output within the local environment;
constructing, by at least one of the one or more processors of the centralized server, a second computer readable map based on the location of the at least one insight, wherein the second computer readable map includes a plurality of user selectable locations corresponding to each respective location of the at least one image captured by the robot at each corresponding location of the at least one images, each of the user selectable locations includes one or more of the at least one insights which correspond to the respective selectable location, the one or more of the at least one insights are displayed on the second computer readable map based on the determined location of the at least one insight; and
providing, by at least one of the one or more processors of the centralized server, a device with at least a portion of the second computer readable map when requested by the device.

14. The method of claim 13, wherein,
upon the user selecting a location of the plurality, at least one processor of the one or more processors of the centralized server displays the at least one image captured by the robot at the selected location.

15. The method of claim 14, wherein,
at least one of the one or more processors of the centralized server communicates at least one additional image corresponding to a neighboring location to the selected location causing the device to store the at least one additional image in a buffer.

16. The method of claim 14, wherein,
the at least one image captured at each of the locations comprises at least one of a plurality of images stitched or aligned together, a panoramic image, or a 360° view image captured by a wide field of view camera.

17. The method of claim 14, further comprising:
identifying, by at least one of the one or more processors of the centralized server, one or more features within the image displayed at the selected location based on the labeled data output from the selected at least one model.

18. The method of claim 17, further comprising:
transmitting, by at least one of the one or more processors of the centralized server, an identification of one or more features within the image to cause the device to display the identification of one or more features, the one or more features corresponding to selected ones of a plurality of features depicted at the location.

19. The method of claim 13, further comprising:
responsive to a selection of one or more of the plurality of user selectable locations, causing, by at least one of the one or more processors of the centralized server, a first robot of the at least one robots to perform at least one action consisting of navigating the first robot to the location of the labeled data output within the environment and moving the one or more features of the labeled output data from the first location to a second location within the environment, wherein selecting the at least one model from the plurality of models is further based on historical data associated with the feature data in the at least one image and the local environment.

20. The method of claim 13, further comprising:
receiving, by at least one of the one or more processors of the centralized server, a second set of images from a second robot in a separate second environment, the second robot being distinct from the at least one robot;
determining, by at least one of the one or more processors of the centralized server and based on the corresponding second environment of the second robot, one or more models to identify the feature data within the second set of images from the second robot to produce a second labeled data output, the second labeled output data comprising an identification of one or more features within the second set of images and is selected based in part on the confidence thereof;
wherein, the one or more models are different than the at least one selected model used to identify the feature data within the images from the at least one robot.

21. A server system, comprising:
at least one robot coupled thereto;
a plurality of models coupled to the server system configured to identify features within imagery with an associated confidence; and
one or more processors of a centralized server configured to execute computer readable instructions that cause at least one of the one or more processors of the centralized server to:
  receive at least one image from a sensor on the at least one robot, each of the at least one images include a corresponding location comprising a local environment in which the robot is navigating during acquisition of the image, wherein the at least one image comprises feature data;
  select, based at least in part on the corresponding location of each of the at least one image, at least one model trained to process the feature data from the plurality of models and communicate the feature data to the selected at least one model, the corresponding location of each of the at least one images being on a first computer readable map produced by the at least one robot;
  cause each of the at least one selected model to identify the feature data within each corresponding image to produce a labeled data output, wherein the labeled output data comprises an identification of one or more features within each image and is selected based in part on a confidence thereof;
  determine, based upon the corresponding location of each of the at least one image on the first computer readable map and an image-space position of each respective feature in each corresponding image, a location of the labeled data output within the local environment
  generate at least one insight comprising at least in part the location of the labeled data output within the local environment;
  construct a second computer readable map based on the location of the at least one insight, wherein the second computer readable map includes a plurality of user selectable locations corresponding to each respective location of the at least one image captured by the robot at each corresponding location of the at least one images, each of the user selectable locations includes one or more of the at least one insights which correspond to the respective selectable location, the one or more of the at least one insights are displayed on the second computer readable map based on the determined location of the at least one insight;
  identify one or more insights within each of the at least one image displayed at the selected location using one or more models coupled to the server;
  provide a device with at least a portion of the second computer readable map when requested by the device; and
  transmit identification of one or more features within each of the at least one image to cause the device to display the identification of one or more features, the one or more features corresponding to selected ones of a plurality of features depicted at the corresponding location;
wherein,
  upon the user selecting a location of the plurality, the at least one processor displays the at least one image captured by the robot at the selected location;
  the at least one processor communicates at least one additional image corresponding to a neighboring location to the selected location causing the device to store the at least one additional image in a buffer; and
  each of the at least one image captured at each of the locations comprises at least one of a plurality of images stitched or aligned together, a panoramic image, or a 360° view image captured by a wide field of view camera.

* * * * *